US012770128B2

(12) United States Patent
Franklin et al.

(10) Patent No.: US 12,770,128 B2
(45) Date of Patent: Oct. 20, 2026

(54) DOCUMENT REMEMBRANCE AND COUNTERFEIT DETECTION

(71) Applicant: Capital One Services, LLC, McLean, VA (US)

(72) Inventors: Keegan Franklin, Tuscon, AZ (US); James Brighter, Reston, VA (US); Megan Obrien, New Orleans, LA (US); John Maillett, Arlington, VA (US); Jane Justiz, McLean, VA (US); Thomas Dennis, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 31 days.

(21) Appl. No.: 18/607,884

(22) Filed: Mar. 18, 2024

(65) Prior Publication Data

US 2025/0292227 A1 Sep. 18, 2025

(51) Int. Cl.
*G06Q 20/32* (2012.01)
*G06Q 20/04* (2012.01)

(52) U.S. Cl.
CPC ....... *G06Q 20/3223* (2013.01); *G06Q 20/042* (2013.01); *G06Q 20/0425* (2013.01)

(58) Field of Classification Search
CPC .. G06Q 20/042; G06Q 20/0425; G06Q 40/02; G06Q 20/3223
USPC ..................... 235/379; 705/45; 382/137, 138
See application file for complete search history.

(56) References Cited

U.S. PATENT DOCUMENTS 5,515,451 A 5/1996 Tsuji et al.
7,391,934 B2 6/2008 Goodall et al.
7,421,107 B2 9/2008 Lugg
7,526,117 B2 4/2009 Foth et al.
7,587,066 B2 9/2009 Cordery et al.
7,698,222 B1 4/2010 Bueche
7,702,588 B2 4/2010 Gilder et al.
7,734,545 B1 6/2010 Fogliano et al.
7,818,307 B1 10/2010 Young et al.
7,856,402 B1 12/2010 Kay
7,905,396 B2 3/2011 Tidwell et al.

(Continued)

FOREIGN PATENT DOCUMENTS

JP 2020021419 A 2/2020
KR 2570769 B1 8/2023

OTHER PUBLICATIONS

Rose, Lydia M. "Modernizing check fraud detection with machine learning." PhD dissertation. Utica College. 2018.

(Continued)

*Primary Examiner* — Daniel A Hess

(74) *Attorney, Agent, or Firm* — Sterne, Kessler, Goldstein & Fox P.L.L.C.

(57) ABSTRACT

A system, apparatus, device, method and/or computer program product for identifying, in a remote deposit system, a level of correspondence of a financial instrument with past deposit activity. The level of correspondence may be used to determine a funds availability schedule and/or identify counterfeit financial instruments. In some embodiments, the level of correspondence may be determined by comparing a date associated with the financial instrument to a date parameter, an amount of the financial instrument to an amount parameter, and/or one or more financial instrument characteristics with one or more payer-specific financial instrument characteristics.

20 Claims, 9 Drawing Sheets

(56) References Cited

U.S. PATENT DOCUMENTS

| | | | |
|---|---|---|---|
| 7,949,587 B1 | 5/2011 | Morris et al. | |
| 8,027,928 B1 | 9/2011 | Hecht, Jr. et al. | |
| 8,050,997 B1 | 11/2011 | Nosek et al. | |
| 8,060,442 B1 | 11/2011 | Hecht et al. | |
| 8,104,676 B2 | 1/2012 | Ramachandran | |
| 8,213,782 B2 | 7/2012 | Jelinek | |
| 8,271,381 B2 | 9/2012 | O'Brien et al. | |
| 8,290,876 B1 | 10/2012 | Powell | |
| 8,296,230 B2 | 10/2012 | Davis et al. | |
| 8,300,917 B2 | 10/2012 | Borgia et al. | |
| 8,332,329 B1 | 12/2012 | Thiele | |
| 8,406,500 B2 | 3/2013 | Najari et al. | |
| 8,464,933 B1 | 6/2013 | Prasad et al. | |
| 8,532,419 B2 | 9/2013 | Coleman | |
| 8,559,766 B2 | 10/2013 | Tilt et al. | |
| 8,582,862 B2 | 11/2013 | Nepomniachtchi et al. | |
| 8,605,982 B2 | 12/2013 | Jackson et al. | |
| 8,626,661 B2 | 1/2014 | Gilder | |
| 8,632,001 B1 | 1/2014 | Ramachandran et al. | |
| 8,638,363 B2 | 1/2014 | King et al. | |
| 8,639,105 B2 | 1/2014 | Ogino | |
| 8,708,227 B1 | 4/2014 | Oakes, III et al. | |
| 8,745,073 B2 | 6/2014 | Mulligan et al. | |
| 8,811,711 B2 | 8/2014 | Calman et al. | |
| 8,885,963 B2 | 11/2014 | Coleman | |
| 8,958,605 B2 | 2/2015 | Amtrup et al. | |
| 8,959,033 B1 | 2/2015 | Oakes, III et al. | |
| 8,983,170 B2 | 3/2015 | Nepomniachtchi et al. | |
| 8,995,012 B2 | 3/2015 | Heit et al. | |
| 9,064,248 B2 | 6/2015 | Huff et al. | |
| 9,307,206 B2 | 4/2016 | Tilt | |
| 9,324,073 B2 | 4/2016 | Nepomniachtchi et al. | |
| 9,384,392 B2 | 7/2016 | Weber et al. | |
| 9,483,761 B2 | 11/2016 | Brendell et al. | |
| 9,558,493 B2 | 1/2017 | Carrott | |
| 9,569,756 B1 | 2/2017 | Bueche, Jr. et al. | |
| 9,640,041 B2 | 5/2017 | Block et al. | |
| 9,652,690 B2 | 5/2017 | Eid et al. | |
| 9,661,216 B2 | 5/2017 | Tilt | |
| 9,672,510 B2 | 6/2017 | Roach et al. | |
| 9,679,281 B2 | 6/2017 | Moshal | |
| 9,684,920 B2 | 6/2017 | Kalgi et al. | |
| 9,721,177 B2 | 8/2017 | Lee et al. | |
| 9,747,509 B2 | 8/2017 | Eid et al. | |
| 9,779,392 B1 | 10/2017 | Prasad et al. | |
| 9,807,263 B2 | 10/2017 | Bala et al. | |
| 9,852,406 B2 | 12/2017 | Doyle et al. | |
| 9,852,409 B2 | 12/2017 | Artman et al. | |
| 10,026,119 B2 | 7/2018 | Green et al. | |
| 10,192,108 B2 | 1/2019 | Nepomniachtchi et al. | |
| 10,210,522 B1 | 2/2019 | Medina, III et al. | |
| 10,217,375 B2 | 2/2019 | Waldron et al. | |
| 10,402,790 B1 | 9/2019 | Clark et al. | |
| 10,460,381 B1 | 10/2019 | Pollack et al. | |
| 10,504,185 B1 | 12/2019 | Buentello | |
| 10,552,810 B1 | 2/2020 | Ethington et al. | |
| 10,635,898 B1 | 4/2020 | Pribble et al. | |
| 10,692,230 B2 | 6/2020 | Anderson et al. | |
| 10,699,146 B2 | 6/2020 | Shustorovich et al. | |
| 10,706,466 B1 | 7/2020 | Ethington et al. | |
| 10,762,579 B2 | 9/2020 | Riechers et al. | |
| 10,769,598 B1 | 9/2020 | Oakes, III et al. | |
| 10,789,496 B2 | 9/2020 | Kotovich et al. | |
| 10,853,771 B2 | 12/2020 | Enobakhare | |
| 10,855,914 B1 | 12/2020 | Prasad et al. | |
| 10,909,362 B2 | 2/2021 | Nepomniachtchi et al. | |
| 11,064,111 B1 | 7/2021 | Prasad et al. | |
| 11,068,867 B1 | 7/2021 | Tucker | |
| 11,126,975 B2 | 9/2021 | Haldenby et al. | |
| 11,127,008 B1 | 9/2021 | Buentello et al. | |
| 11,145,169 B2 | 10/2021 | Pratten et al. | |
| 11,157,731 B2 | 10/2021 | Nepomniachtchi et al. | |
| 11,159,733 B2 | 10/2021 | Mukul | |
| 11,200,550 B1 | 12/2021 | Singfield | |
| 11,210,379 B1 | 12/2021 | Lindley et al. | |
| 11,216,884 B1 | 1/2022 | Buentello | |
| 11,222,313 B2 | 1/2022 | Doyle et al. | |
| 11,244,302 B2 | 2/2022 | Ekpenyong et al. | |
| 11,244,319 B2 | 2/2022 | Navarro et al. | |
| 11,282,086 B1 | 3/2022 | Medina, III et al. | |
| 11,288,661 B2 | 3/2022 | Hammad et al. | |
| 11,295,377 B1 | 4/2022 | Ethington et al. | |
| 11,295,378 B1 | 4/2022 | Voutour et al. | |
| 11,315,217 B2 | 4/2022 | Ilic et al. | |
| 11,321,709 B1 | 5/2022 | Kolchin | |
| 11,373,150 B1 | 6/2022 | Bueche, Jr. et al. | |
| 11,449,841 B1 | 9/2022 | Srinivasarangan et al. | |
| 11,516,383 B2 | 11/2022 | Ilic et al. | |
| 11,531,973 B1 | 12/2022 | Prasad et al. | |
| 11,539,848 B2 | 12/2022 | Roach et al. | |
| 11,562,332 B1 | 1/2023 | Oakes, III et al. | |
| 11,610,294 B2 | 3/2023 | Dewitt et al. | |
| 11,640,627 B2 | 5/2023 | Fotso et al. | |
| 11,676,285 B1 | 6/2023 | Backlund et al. | |
| 11,682,222 B1 | 6/2023 | Oakes, III et al. | |
| 11,694,268 B1 | 7/2023 | Buentello | |
| 11,704,627 B2 | 7/2023 | Gordon et al. | |
| 11,710,210 B1 | 7/2023 | Medina, III | |
| 11,798,253 B2 | 10/2023 | Pribble et al. | |
| 11,810,382 B2 | 11/2023 | Laza et al. | |
| 11,829,962 B2 | 11/2023 | Burnam et al. | |
| 11,900,755 B1 | 2/2024 | Bueche, Jr. | |
| 12,062,088 B1 | 8/2024 | Medina et al. | |
| 12,260,700 B1 | 3/2025 | Bueche, Jr. | |
| 12,347,221 B1 | 7/2025 | Sureka et al. | |
| 2005/0283444 A1 | 12/2005 | Ekberg | |
| 2006/0036537 A1 | 2/2006 | Lawrence et al. | |
| 2006/0282383 A1* | 12/2006 | Doran | G06Q 20/24<br>705/45 |
| 2008/0140579 A1 | 6/2008 | Agarwal | |
| 2009/0171839 A1 | 7/2009 | Rosano et al. | |
| 2012/0040717 A1 | 2/2012 | Levy et al. | |
| 2013/0013491 A1 | 1/2013 | Selway et al. | |
| 2013/0054461 A1 | 2/2013 | Gupta et al. | |
| 2013/0176473 A1 | 7/2013 | Ogino | |
| 2013/0198069 A1 | 8/2013 | Latimer | |
| 2013/0204783 A1 | 8/2013 | Klose et al. | |
| 2014/0074697 A1 | 3/2014 | Foster | |
| 2014/0114852 A1 | 4/2014 | Rajagopal et al. | |
| 2014/0122332 A1 | 5/2014 | Viera et al. | |
| 2014/0236767 A1 | 8/2014 | Duggal et al. | |
| 2015/0032626 A1 | 1/2015 | Dill et al. | |
| 2015/0117748 A1* | 4/2015 | Smith | G06V 30/416<br>382/137 |
| 2015/0120564 A1 | 4/2015 | Smith et al. | |
| 2017/0270508 A1 | 9/2017 | Roach et al. | |
| 2017/0309108 A1 | 10/2017 | Sadovsky et al. | |
| 2017/0336511 A1 | 11/2017 | Nerurkar | |
| 2018/0234472 A1 | 8/2018 | Malakar | |
| 2020/0042955 A1 | 2/2020 | Widdows | |
| 2020/0334647 A1 | 10/2020 | Malhotra et al. | |
| 2020/0389600 A1 | 12/2020 | Capurso et al. | |
| 2021/0174361 A1 | 6/2021 | Potireddy et al. | |
| 2021/0248609 A1* | 8/2021 | Singh | G06Q 40/02 |
| 2021/0360149 A1 | 11/2021 | Mukul | |
| 2022/0245985 A1 | 8/2022 | Bhutani et al. | |
| 2022/0277291 A1 | 9/2022 | Roongta et al. | |
| 2022/0335393 A1 | 10/2022 | Gupta et al. | |
| 2022/0343301 A1 | 10/2022 | Edwards et al. | |
| 2022/0358575 A1 | 11/2022 | Smith | |
| 2023/0060395 A1 | 3/2023 | Roach et al. | |
| 2023/0060464 A1 | 3/2023 | Ceesay | |
| 2023/0084370 A1 | 3/2023 | Bradford | |
| 2023/0120865 A1 | 4/2023 | Nascimento et al. | |
| 2023/0133158 A1 | 5/2023 | Kolchin | |
| 2023/0196319 A1 | 6/2023 | Ng et al. | |
| 2023/0196706 A1 | 6/2023 | Scott | |
| 2023/0209116 A1 | 6/2023 | Leung et al. | |
| 2023/0281629 A1 | 9/2023 | Shevyrev et al. | |
| 2023/0289808 A1 | 9/2023 | Kolchin | |
| 2023/0351782 A1 | 11/2023 | Fitzgerald | |

(56) References Cited

U.S. PATENT DOCUMENTS

2024/0161114 A1* 5/2024 Zhang .................. G06V 30/418
2024/0378589 A1 11/2024 Kolchin

OTHER PUBLICATIONS remotedepositcapture.com, "Ensenta Business Mobile with Multi-Check", Available from the Internet at https://www.remotedepositcapture.com/RDC/media/RDC-Forum/Submitted-Sponsor-Brochures/EnsentaBusinessMobileMultiCheck-e -_ 2018_2_14_12_52_3.pdf, [site visited on May 19, 2023], pp. 1-2.
Bills, Steve, "Automated Amount Scanning Is Trend in Remote-Deposit," American Banker, New York, NY, Aug. 30, 2005, (3 pgs).
Dunga et al. "Electronic Booking and Payment Platforms for Inter-Campus E-Bikes". Engineering Proceedings. Jul. 14, 2023. pp. 1-14. vol. 41, Issue 12.
Aletihadpayments. "Aani | Split the bill with your friends". Oct. 16, 2023. Located via YouTube, free copy available at https://www.youtube.com/watch?v=_wys12-0KmE.
Katariya. "Mastering QR Code Payments: A Guide to Seamless and Effortless Transactions". Jun. 12, 2023. Located via Google Web, free copy available at https://www.mooninvoice.com/blog/qr-code-payments/.
Natwest. "Request money from someone or split a bill". Retrieved from the Internet on Dec. 21, 2023. Located via Google Web, free copy available at https://www.natwest.com/waystopay/payme.html.
Spoton. "QR Scan & Pay / Order & Pay | SpotOn Order". Jul. 19, 2023. Located via Google Web, free copy available at https://help.spoton.com/space/SK/2457829381/QR+Scan+%26+Pay+%2F+Order+%26+Pay+%7C +SpotOn+Order.
Spoton. "QR Split Payment | SpotOn Order". Jul. 19, 2023. Located via Google Web, free copy available at https://help.spoton.com/space/SK/2262565040/QR+Split+Payment+%7C+SpotOn+Order.
photo.stackexchange.com, "What of those EXIF values tell me more about my image's quality?" Jul. 8, 2017, Photography Stack Exchange, Located via Google Web, available at https://photo.stackexchange.com/questions/90730/what-of-those-exif-values-tell-me-more-about-my-images-quality.
Abraham, "Moire Pattern Detection using Wavelet Decomposition and Convolutional Neural Network," Amadeus Software Labs Pvt. Ltd, IEEE (2018).
Yang, et al., "Doing More with Moire Pattern Detection in Digital Photos," Journal of Latex Class Files, vol. 14, No. 8 (Aug. 2021).
Digital Check, "Money Orders Giving You Trouble? We've Got The Solution!" Oct. 1, 2008. Located via Google Web, available at https://www.digitalcheck.com/moneyorders-dcom/.

* cited by examiner

DOCUMENT REMEMBRANCE AND COUNTERFEIT DETECTION

BACKGROUND

As technology evolves, institutions have found ways to make digital document verification more convenient. For example, in the financial industry, mobile banking apps may let you deposit paper checks from virtually anywhere using a smartphone or tablet to take and submit an image of the paper check for processing. However, it can be difficult to verify that a document is not counterfeit. For example, a customer may attempt to create a counterfeit document, either by creating a counterfeit physical document and taking an image of the physical document or by digitally creating an image of a document. In either case, it may be difficult for a system receiving an image of the document to identify that the document in the image is counterfeit. This may be because no physical document may be available for an individual to inspect. It may be more difficult for computer systems to identify certain features, for example, unusual thickness, pliability, or presence or lack of edge features (e.g., serrations from a tear line), that would indicate a document is counterfeit. Further, computer systems that rely on an image of a document (e.g., a check) to complete remote deposits may not be able to verify that the MICR line of a check actually contains magnetic ink. Additionally, it may be difficult for computer systems to identify a counterfeit document when the document image is a digitally created image, since the image may have been created from an image of a real document with certain features altered.

To perform digital document verification, it may be advantageous to track patterns and features of documents in order to verify whether future documents align with tracked patterns and features, and are therefore more likely to be valid. Additionally, tracking patterns and features of documents can speed the delivery of services, goods, or funds to a customer by enabling the verification process to involve comparison to past patterns and features to avoid contextless analysis of a document.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
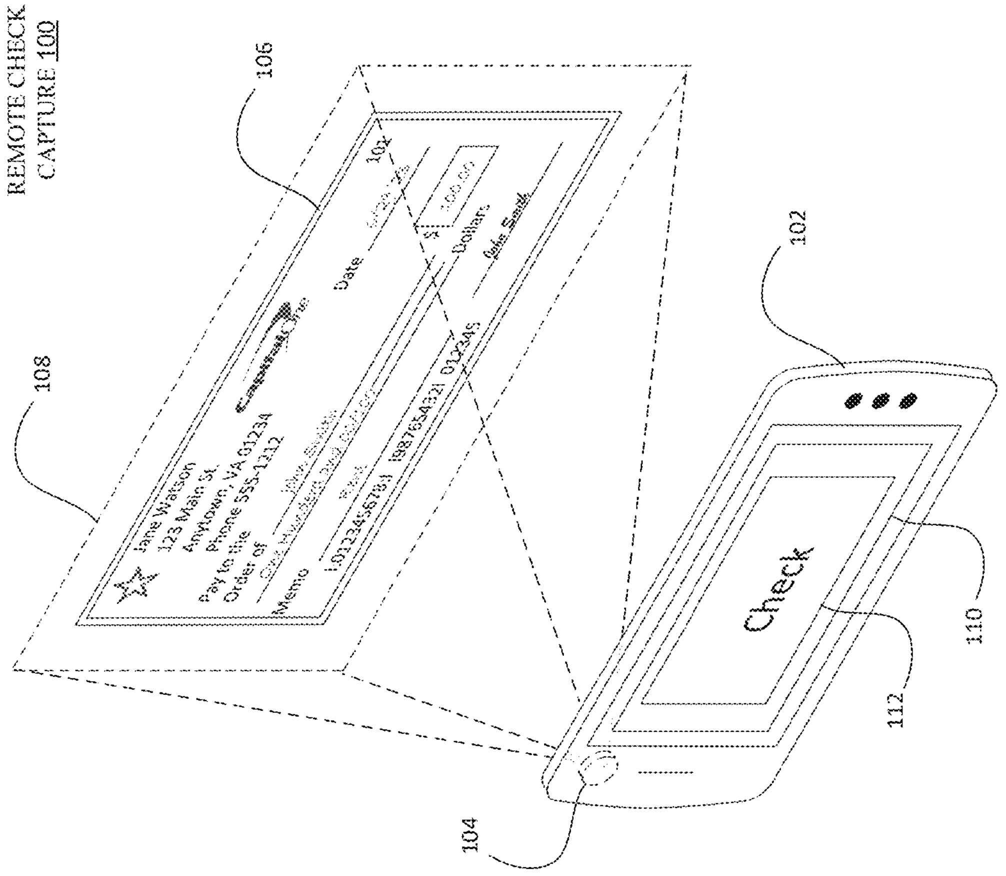
FIG. 1 illustrates an example remote check capture, according to some embodiments and aspects.

Disclosed herein are system, apparatus, device, method, and/or computer program product embodiments, and/or combinations and sub-combinations thereof, for providing dynamic availability of services, goods, or funds based on document submission patterns associated with a user. The system, apparatus, device, method, and/or computer program product embodiments, and/or combinations and sub-combinations thereof, may further reliably identify document images that present a high risk of fraud (e.g., a counterfeit document).

The embodiments disclosed herein may be implemented in any context in which digital verification of documents is required. In some embodiments, the embodiments disclosed herein may be implemented as part of a mobile check deposit process. Mobile check deposit is a fast, convenient way to deposit funds using a customer's mobile device. As financial technology and digital money management tools continue to evolve, the process has become safer and easier than ever before. Mobile check deposit is a way to deposit a paper check through a customer's mobile banking app using a smartphone or tablet. A mobile deposit allows the customer to capture a picture of the check using, for example, their smartphone or tablet camera and process it through a mobile banking application running on the mobile device. Deposits commonly include, but are not limited to, personal, business or government checks.

Currently, computer-based (e.g., laptop) or mobile-based (e.g., mobile device) technology allows a customer to initiate a document uploading process for uploading images or other electronic versions of a document to a backend system (e.g., a document processing system) for various purposes, including remote check deposit. In some cases, once the image or other electronic version of a document (e.g., a check) is processed, the technology provides an estimated time of availability of funds to the customer. In some cases, this availability of funds may be independent of or factors too lightly the past deposit history of a customer. For example, a customer may have to wait a day or more to access funds after submitting an image of a check for remote deposit, even though the check may represent consistent behavior on the part of the customer (e.g., regularly depositing a paycheck).

This restrictive approach may be necessitated in certain document upload processes because such processes have automated routines for receiving the images, processing the images, and completing actions associated with the upload of the images. For example, a customer may utilize a mobile deposit application to upload a document associated with a customer account, such as a check associated with the customer's bank account. Once initiated, in existing systems, the document upload process may continue until the check image has been uploaded, processed, and has passed image quality checks. Information associated with the check image may be provided to a funds availability model that determines when funds should be available. The funds availability model may consider factors such as the amount of the deposit in determining when funds should be available. But the funds availability model may not consider contextual data such as the payer, the dates associated with checks from the payer, and/or the amounts of previously deposited checks from the payer. Accordingly, the funds availability model may not provide an exception for check images that represent repeat deposits (e.g., regular paycheck deposits), where the customer has established a regular history of non-fraudulent check deposits. For example, the funds availability model might set a minimum delay time between image submission and funds availability, hindering availability of funds that might otherwise be immediately and safely released based on a customer's deposit history.

This current process is problematic because a customer cannot immediately access funds that the customer's past deposit behavior indicates should be immediately available to the customer. That is, the current process is problematic because it cannot identify, quickly and easily, and in some cases without an image passing through a separate funds availability model, when a check image presents a low risk for fraud such that deposit funds should be released immediately to the customer.

Most banks and financial institutions use advanced security features to keep an account safe from fraud during the mobile check deposit workflow. For example, security measures may include encryption and device recognition technology. In addition, mobile check applications may capture the check deposit information without permanently storing the photos on the customer's mobile device (e.g., smartphone). Mobile check deposit may also eliminate or reduce typical check fraud as a thief of the check may not be allowed to subsequently make use of an already electronically deposited check, whether it has cleared or not, as remote deposit systems may provide an alert to the banking institution of a second deposit attempt. In addition, fraud controls may include mobile security alerts, such as mobile security notifications or SMS text alerts, which can assist in uncovering or preventing potentially fraudulent activity.

Currently, mobile check deposits may be limited to a delay in funds availability or may include a limited funds availability over a scheduled time period. For example, a first, second, and third portion may be available over time (e.g., 48 hours). In some cases, the customer may be limited on how much they can deposit per transaction, or how much on a daily, weekly or monthly basis.

Despite these security measures, a remote check deposit system may still be vulnerable to fraud. For example, a customer may attempt to create a counterfeit check, either by creating a counterfeit physical check and taking an image of the physical check or by digitally creating an image of a check. In either case, it may be difficult for the remote check deposit system to identify that the check in the image a counterfeit. This may be because no physical check may be available for an individual (e.g., a teller) to inspect visually and by touch or scanning. It may be more difficult for computer systems to identify certain features, for example, unusual thickness, pliability, or presence or lack of edge features (e.g., serrations from a tear line), that would indicate a check is counterfeit. Further, computer systems that rely on an image of a check to complete remote deposits may not be able to verify that the MICR line of a check actually contains magnetic ink. Additionally, it may be difficult for computer systems to identify a counterfeit check when the check image is a digitally created image, since the image may have been created from an image of a real check with certain features altered.

The technology described herein in the various embodiments and aspects may determine, based on data on check deposit patterns and/or data on check characteristics obtained through image processing, when an image of a check corresponds to established non-fraudulent deposit activity patterns. Accordingly, the technology described herein in the various embodiments and aspects may either alter funds availability to more quickly release funds to a customer, based on an image of a check corresponding to established non-fraudulent deposit activity patterns, or may identify images that pose a high risk for fraud (i.e., are likely to depict counterfeit checks).

In the various embodiments and aspects disclosed herein, Optical Character (OCR) may be used to extract data from a check image. OCR may be implemented locally on a mobile device or at a backend server. OCR is the electronic or mechanical conversion of images of typed, handwritten or printed text into machine-encoded text, whether from a scanned document, a photo of a document, a scene photo, etc. Utilizing this capability, the OCR data (e.g., check issue date, check amount, signature, MICR line, account number, etc.) may be communicated to a check assessment model to compute a likelihood (e.g., a confidence score) that a check corresponds to non-fraudulent deposit activity. The likelihood may be used to compute a funds availability schedule for that specific deposit, which in some cases may provide instant availability. In some embodiments, the funds availability schedule may be provided to a mobile banking app and rendered on a user interface (UI). The phrase "funds availability" may be interchangeable with the phrase "deposit availability" throughout the disclosure and drawings. In some embodiments, the likelihood that a check corresponds to non-fraudulent deposit activity may also be used to deny deposit of the check or delay availability of funds until further validation checks have been performed. In such embodiments, a denial of remote deposit availability may be provided to the mobile banking app and rendered on the UI to deter a fraudulent transaction.

In some embodiments, real-time Optical Character (OCR) may implement an OCR of check imagery locally on the mobile device or on cloud banking system 316 mid-experience instead of after submission of a check image, as described in U.S. patent application Ser. No. 18/509,748, filed Nov. 15, 2023 and titled "Deposit Availability Schedule," the disclosure of which is incorporated by reference herein in its entirety. Utilizing this capability, the funds availability schedule or denial of remote deposit availability may be returned to the customer's mobile device in real-time, before or immediately after the customer has submitted a deposit request. Accordingly, the funds availability schedule or denial of remote deposit availability may be provided to the mobile banking app and rendered on the UI mid-experience, thus allowing the customer flexibility in depositing a check (e.g., the customer may decide not to continue with remote deposit based on the funds availability schedule or denial of deposit availability). Further, rendering a denial of remote deposit availability on the UI mid-experience may save a customer time, preventing the customer from waiting, for example, a day or more, before receiving a denial of remote deposit availability when the customer could have attempted to deposit the check in person after receiving a denial of remote deposit availability in real time.

In some embodiments, the OCR process used to extract data from a check image may be implemented with an active OCR process. However, other known and future OCR applications may be substituted without departing from the scope of the technology disclosed herein. Active OCR is further described in U.S. application Ser. No. 18/503,778, entitled "Active OCR," filed Nov. 7, 2023, and incorporated by reference in its entirety. Active OCR may perform OCR processing on image objects formed from a live stream of image data originating from an activated camera on a client device. The image objects may capture portions of a check or an entire image of the check. As a portion of a check image may be formed into a byte array, it may be provided to the active OCR system to extract any data fields found within the byte array in real-time or near real-time.

In the various embodiments and aspects disclosed herein, image processing, including OCR, may be performed to determine document characteristics. Document characteristics may include, but are not limited to, dimensions, color data, text content, a boundary profile, feature location, and typeface. All or a subset of these document characteristics may be determined by an image processing system from an image of a check. Document characteristics determined for a check can be referred to as "check characteristics. Check characteristics determined from the image of the check may be compared to check characteristics determined for previously deposited checks. Based on the comparison, the remote deposit system disclosed herein may determine a likelihood that the check in the image is counterfeit. Based on the comparison, the remote deposit system disclosed herein may also determine a likelihood that the check in the image is a common check (e.g., a paycheck). Like real-time OCR described above, in some embodiments, other real-time image processing (e.g., augmented reality platform-based image processing as described with respect to FIG. 6) may be used to determine one or more check characteristics. In such embodiments, these one or more check characteristics may be compared to past check characteristics in real-time to assist in providing a customer with a funds availability schedule or denial of remote deposit availability mid-experience.

While the use of real-time OCR and other real-time image processing is described herein, image processing described herein may also be conducted after capture and transfer of an image or images to a cloud banking system (e.g., cloud banking system 316 described with respect to FIG. 3) or third party platform.

Figure 3:
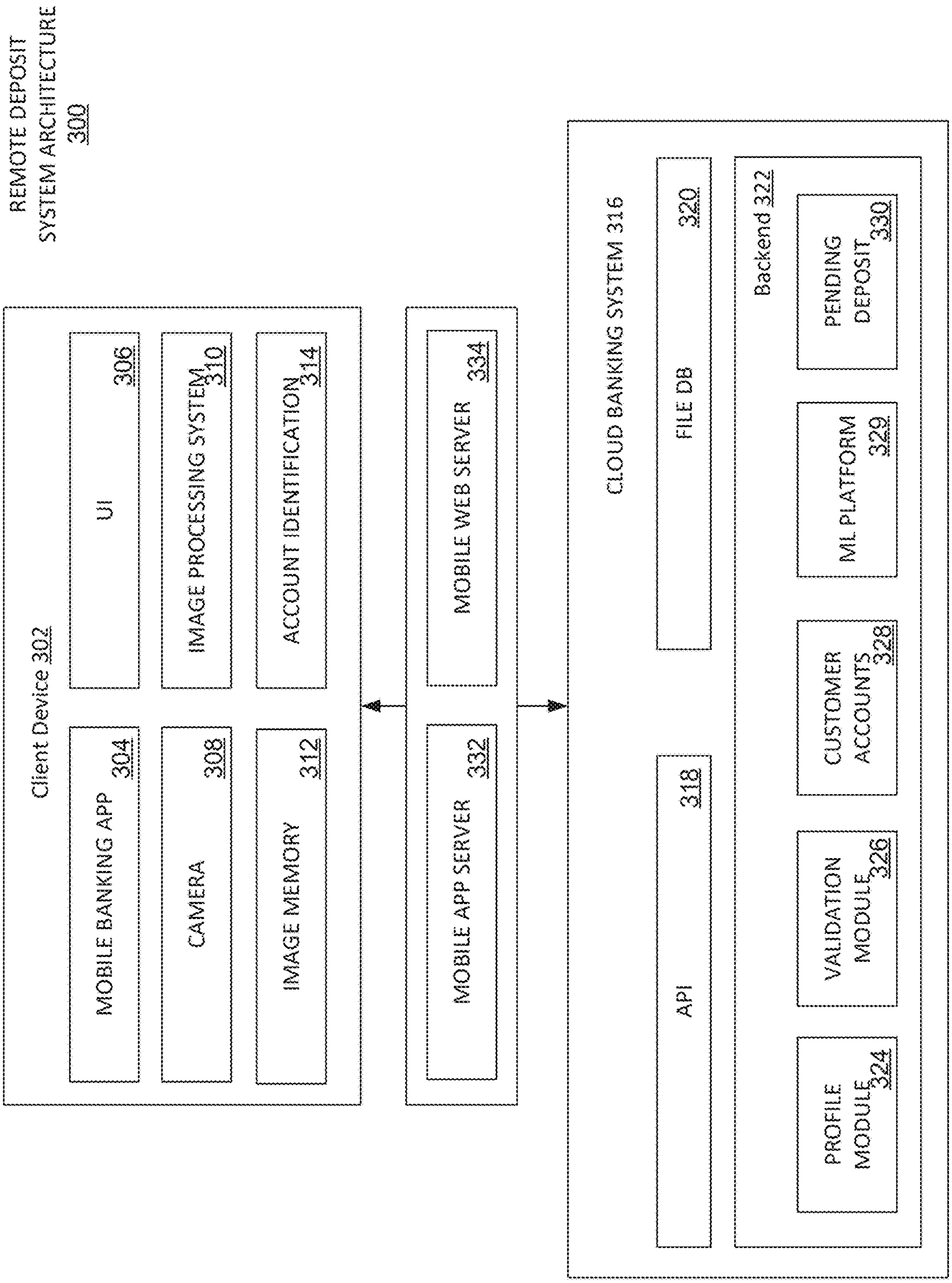
FIG. 3 illustrates a block diagram of an example remote deposit system architecture, according to some embodiments and aspects.
Figure 4:
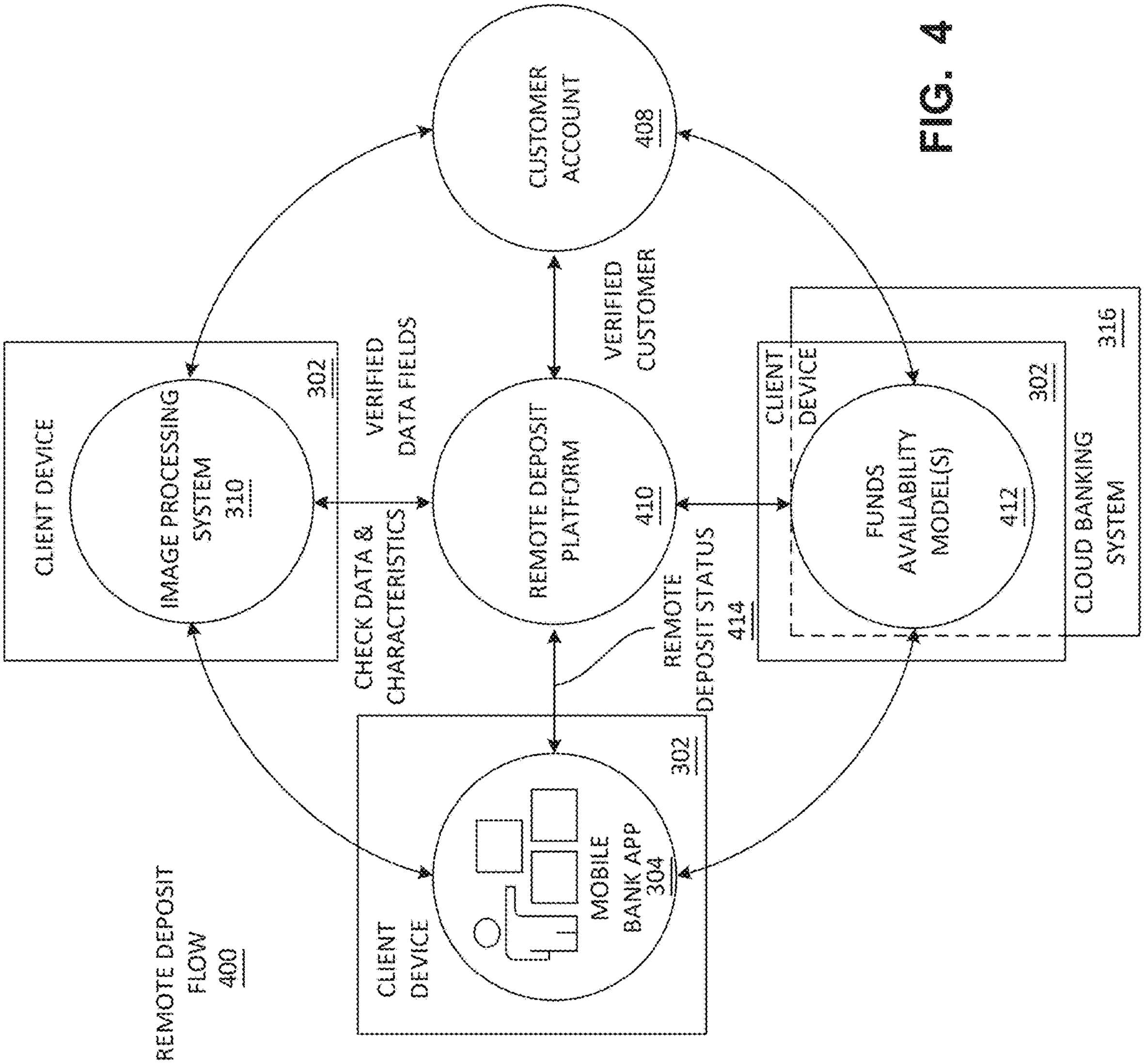
FIG. 4 illustrates a flow diagram of an example remote deposit system, according to some embodiments and aspects.
Figure 5:
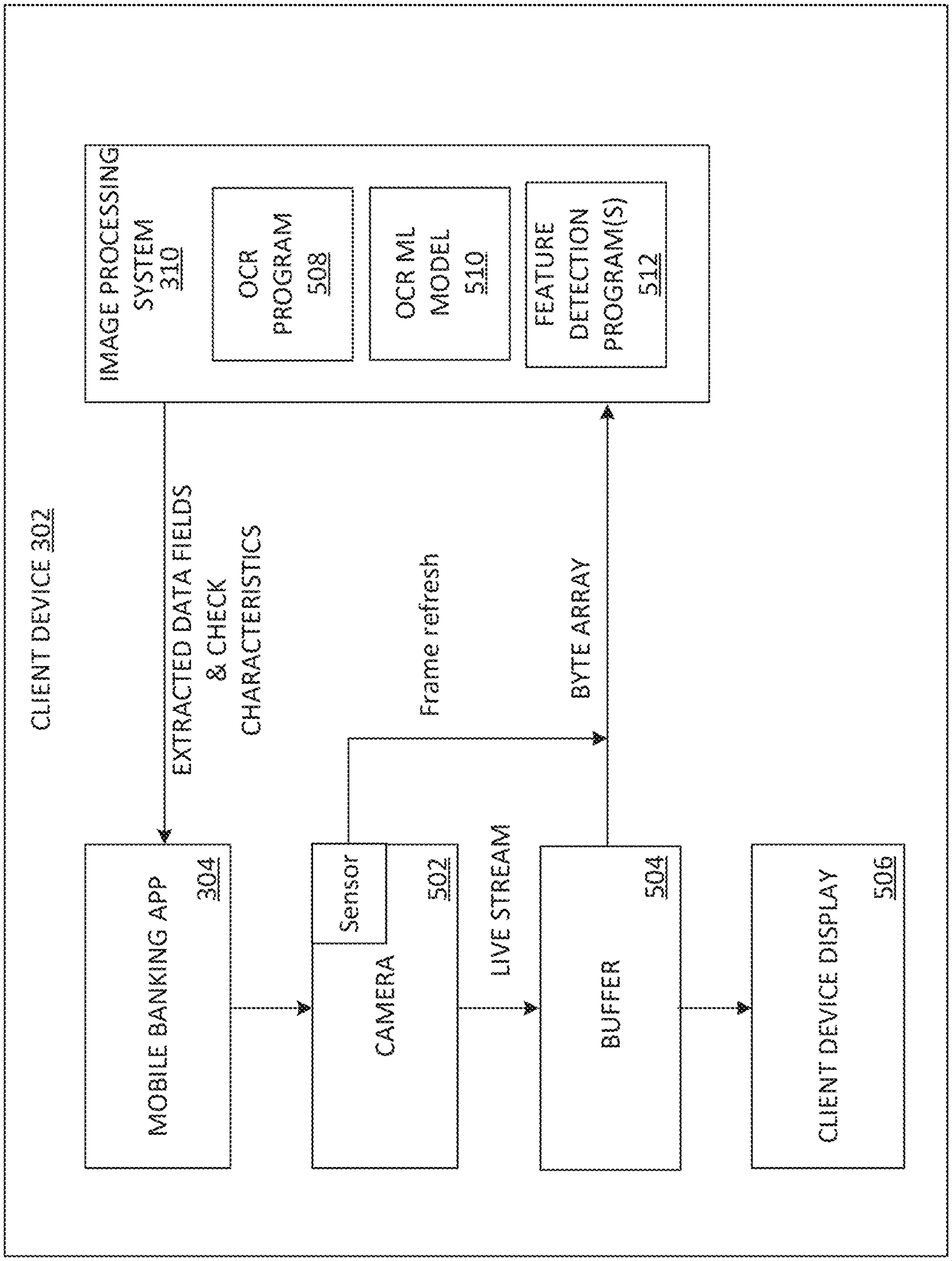
FIG. 5 illustrates a block diagram of an example client computing device, according to some embodiments and aspects.

Various aspects of this disclosure may be implemented using and/or may be part of a remote deposit system shown in FIGS. 3-5. It is noted, however, that this environment is provided solely for illustrative purposes, and is not limiting. Aspects of this disclosure may be implemented using and/or may be part of environments different from and/or in addition to the described remote deposit system, as will be appreciated by persons skilled in the relevant art(s) based on the teachings contained herein.

Variations of the devices disclosed herein are contemplated. For example, in a computing device with a camera, such as a smartphone or tablet, multiple cameras (each of which may have its own image sensor or which may share one or more image sensors) or camera lenses may be implemented to process imagery. For example, a smartphone may implement three cameras, each of which has a lens system and an image sensor. Each image sensor may be the same or the cameras may include different image sensors (e.g., every image sensor is 24 MP; the first camera has a 24 MP image sensor, the second camera has a 24 MP image sensor, and the third camera has a 12 MP image sensor; etc.). In the first camera, a first lens may be dedicated to imaging applications that can benefit from a longer focal length than standard lenses. For example, a telephoto lens generates a narrow field of view and a magnified image. In the second camera, a second lens may be dedicated to imaging applications that can benefit from wide images. For example, a wide lens may include a wider field-of-view to generate imagery with elongated features, while making closer objects appear larger. In the third camera, a third lens may be dedicated to imaging applications that can benefit from an ultra-wide field of view. For example, an ultra-wide lens may generate a field of view that includes a larger portion of an object or objects located within a user's environment. The individual lenses may work separately or in combination to provide a versatile image processing capability for the computing device. While described for three differing cameras or lenses, the number of cameras or lenses may vary, to include duplicate cameras or lenses, without departing from the scope of the technologies disclosed herein. In addition, the focal lengths of the lenses may be varied, the lenses may be grouped in any configuration, and they may be distributed along any surface, for example, a front surface and/or back surface of the computing device.

In one non-limiting example, active OCR processes may benefit from image object builds generated by one or more, or a combination of cameras or lenses. For example, multiple cameras or lenses may separately, or in combination, capture specific blocks of imagery for data fields located within a document that is present, at least in part, within the field of view of the cameras. In another example, multiple cameras or lenses may capture more light than a single camera or lens, resulting in better image quality. In another example, individual lenses, or a combination of lenses, may generate depth data for one or more objects located within a field of view of the camera.

The machine learning (ML) aspects and processes described hereafter may be implemented locally on the customer's mobile device as part of or in addition to the mobile banking app. Alternatively, or in addition, ML model training may be performed remotely from the customer's mobile device, but a fully trained model may be implemented on the mobile device.

Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data," in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning).

A machine-learning engine may use various classifiers to map concepts associated with a specific funds availability structure to capture relationships between concepts (e.g., risk vs. funds made available vs. time) and the customer's history (e.g., as found in a customer profile). The classifier (discriminator) is trained to distinguish (recognize) variations. Different variations may be classified to ensure no collapse of the classifier and so that variations can be distinguished.

Machine learning may involve computers learning from data provided so that they carry out certain tasks. For more advanced tasks, it can be challenging or impractical for a human to manually create the needed algorithms. This may be especially true of teaching approaches to correctly identify customer risk patterns and associated future risk. The discipline of machine learning therefore employs various approaches to teach computers to accomplish tasks where no fully satisfactory algorithm is available. In cases where vast numbers of potential answers exist, one approach, supervised learning, is to label some of the correct answers as valid. This may then be used as training data for the computer to improve the algorithm(s) it uses to determine correct answers.

In some aspects, machine learning models may be trained with other customer's historical information (e.g., previous financial interactions, such as, credit scores, account balances, transactions, such as, bouncing a check, etc.). In addition, large training sets of the other customer's historical information may be used to normalize prediction data (e.g., not skewed by a single or few occurrences of a data artifact).

An example of a remote deposit system shall now be described.

FIG. 1 illustrates an example remote check capture 100, according to some embodiments and aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 1, as will be understood by a person of ordinary skill in the art.

Sample check 106, may be a personal check, paycheck, or government check, to name a few. In some embodiments, a customer will initiate a remote check capture from their mobile computing device (e.g., smartphone) 102, but other digital camera devices (e.g., tablet computer, personal digital assistant (PDA), desktop workstations, laptop or notebook computers, wearable computers, such as, but not limited to, Head Mounted Displays (HMDs), computer goggles, computer glasses, smartwatches, etc., may be substituted without departing from the scope of the technology disclosed herein. For example, when the document to be deposited is personal check, the customer may select a bank account (e.g., checking or savings) into which the funds specified by the check are to be deposited. Content associated with the document may include the funds or monetary amount to be deposited to the customer's account, the issuing bank, the routing number, and the payer's account number. Content associated with the customer's account may include a risk profile associated with the account and the current balance of the account. Options associated with a check deposit process may include continuing with the deposit process or cancelling the deposit process (and thereby cancelling depositing the check into the account).

Mobile computing device 102 may communicate with a bank or third party using a communication or network interface (not shown). The communication interface may communicate and interact with any combination of external devices, external networks, external entities, etc. For example, the communication interface may allow mobile computing device 102 to communicate with external or remote devices over a communications path, which may be wired and/or wireless (or a combination thereof), and which may include any combination of LANs, WANs, the Internet, etc. Control logic and/or data may be transmitted to and from mobile computing device 102 via a communication path that includes the Internet.

In an example approach, a customer may login to their mobile banking app, select the account they want to deposit a check into, then select, for example, a "deposit check" option that will activate their mobile device's camera 104. One skilled in the art would understand that variations of this approach or functionally equivalent alternative approaches may be substituted to initiate a mobile deposit.

Using the camera 104 function on the mobile computing device 102, the customer may capture an image of at least a portion of one side of a check 112. Typically, the camera's field of view 108 will include at least the perimeter of the check. However, any camera position that enables an in-focus electronic capture of the various data fields located on a check may be considered. The image capture can be achieved automatically or manually. Resolution, distance, alignment, and lighting parameters may require movement of the mobile device until a proper capture has been recorded. An application running on the mobile computer device may offer suggestions or technical assistance to complete a proper capture within the banking app's graphically displayed field of view window 110 displayed on a User Interface (UI) instantiated by the mobile banking app. A person skilled in the art of remote check image captures would be aware of common requirements and limitations and would understand that different approaches may be required based on the environment in which the check capture occurs. For example, poor lighting or reflections may require specific alternative techniques. As such, any known or future check capture techniques are considered to be within the scope of the technology described herein.

Sample customer instructions may include, but are not limited to, "Once you've completed filling out the check information and signed the back, it's time to take a picture of your check," "For best results, place your check on a flat, dark-background surface to improve clarity," "Make sure all four corners of the check fit within the on-screen frame to avoid any processing holdups," "Select the camera icon in your mobile app to open the camera," "Once you've taken a clear photo of the front of the check, repeat the process on the back of the check," "Review the details of your check after uploading the images and ensure that the information is correct," "Do you accept the funds availability schedule?" "Swipe the Slide to Deposit button to submit the deposit," "Your deposit request may have gone through, but it's still a good idea to hold on to your check for a few days," "Keep the check in a safe, secure place until you see the full amount deposited in your account," and "After the deposit is confirmed, you can safely destroy the check." These instructions are provided as sample instructions but may include any instructions that guide the customer through a remote deposit session.

Figure 2:
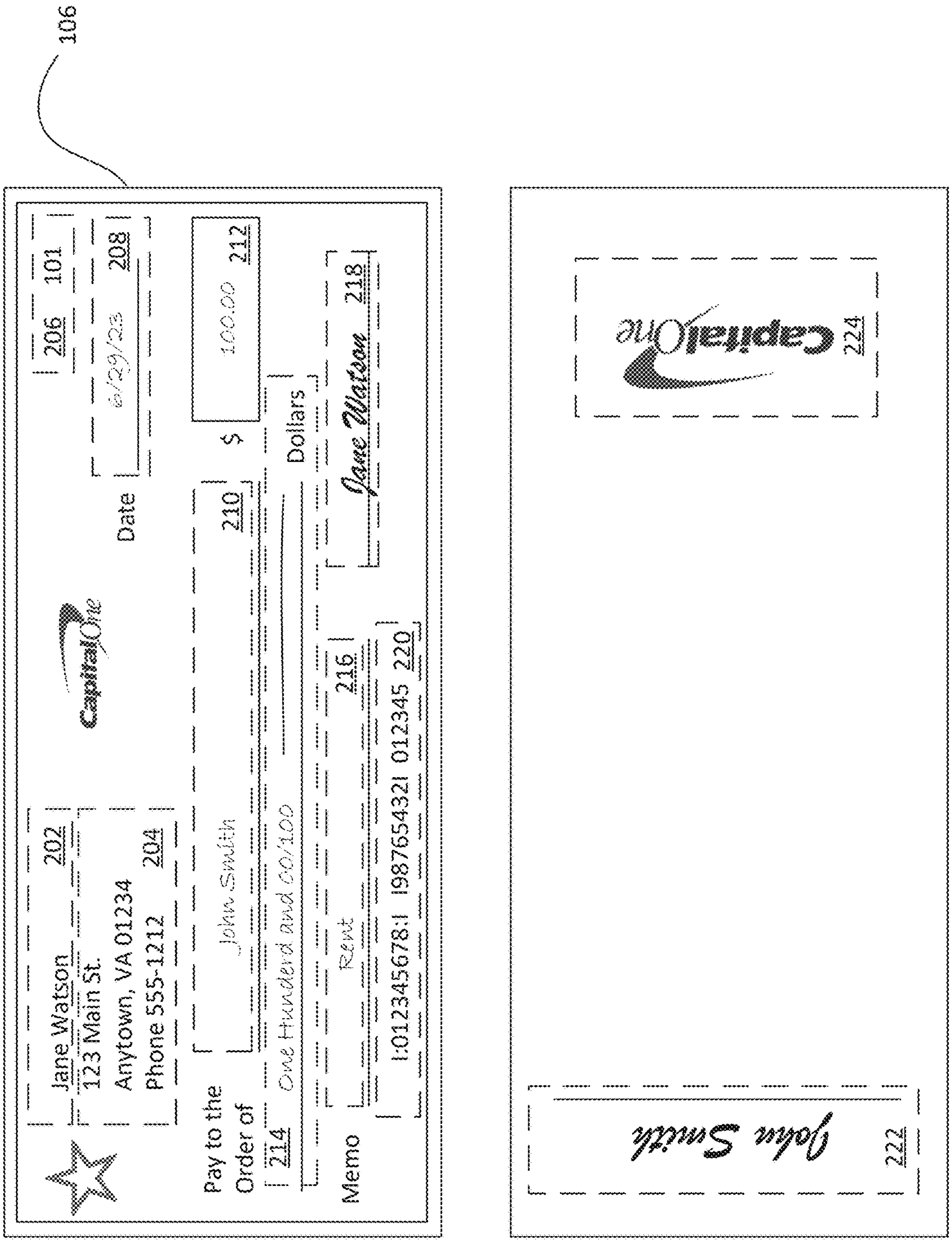
FIG. 2 illustrates example remote deposit OCR segmentation, according to some embodiments and aspects.

FIG. 2 illustrates example remote deposit OCR segmentation, according to some embodiments and aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 2, as will be understood by a person of ordinary skill in the art.

Depending on check type, a check may have a fixed number of identifiable fields. For example, a standard personal check may have front side fields, such as, but not limited to, payer name 202 and address 204; check number 206; date 208; payee field 210; payment amount 212; a written amount 214; memo line 216; Magnetic Ink Character Recognition (MICR) line 220 that includes a string of characters including the payer's bank's routing number, the payer's account number, and the check number; and finally the customer's signature 218. Back side identifiable fields may include, but are not limited to, payee signature 222 and security fields 224, such as a watermark.

While a number of fields have been described, it is not intended to limit the technology disclosed herein to these specific fields as a check may have more or fewer identifiable fields than disclosed herein. In addition, security measures may include alternative approaches discoverable on the front side or back side of the check or discoverable by processing identified information. For example, the remote deposit feature in the mobile banking app running on the mobile computing device 102 may determine whether the payment amount 212 and the written amount 214 are the same. Additional processing may be needed to determine a final amount to process the check if the two amounts are inconsistent. In one non-limiting example, the written amount 214 may supersede any amount identified within the amount field 212.

In some embodiments, OCR of the check, implementing instructions resident on the customer's mobile device or at a backend server, processes each of the field locations on the check systematically. For example, the check may be scanned from top to bottom and fields may be identified as they are scanned. Real-time OCR or instant OCR is described in U.S. application Ser. No. 18/092,617, filed Jan. 3, 2023 and titled "INSTANT OPTICAL CHARACTER RECOGNITION DURING UPLOAD PROCESS," which is incorporated by reference in its entirety. Alternatively, the entire check may be captured and processed via OCR by instructions resident on the customer's mobile device or at a backend server that process each of the field locations on the check simultaneously or sequentially.

In some embodiments, fields that include typed information, such as the MICR line 220, check number 206, payer name 202, and address 204, etc., may be processed first, followed by a more complex or time intensive OCR process of identifying written fields, such as the payee field 210 and/or signature 218, to name a few. In this and other embodiments, the more complex OCR may be performed on the backend server.

As noted above, OCR can be performed on a bank or third party server. In one implementation for initiating OCR of document images at the backend system, for example, the technology disclosed herein may add a request tag to one or more of the document images that are transmitted to the backend system with the request tag indicating that OCR is to be performed. As another example, the document upload application may upload the document images and provide an OCR API (Application Programming Interface) call as separate communications to the backend system, with the OCR API call instructing the backend system to perform the OCR process.

In one embodiment, the mobile banking app may be opened on the mobile device, the check function selected, the camera may be activated, the camera frame buffer populated with an image of the check, real-time OCR performed on the data from the camera frame buffer while on the mobile device, and the identified fields communicated to the check assessment model for determination of a likelihood (e.g., a corresponds score) that the check corresponds to non-fraudulent deposit activity.

It is to be appreciated that not all operations may be needed to perform the disclosure provided herein. Further, some of the operations may be performed simultaneously, or in a different order than described.

In one aspect, the front side imagery may be processed followed by the back side imagery. Alternatively, or in combination, the front side and back side imagery may be captured, stored and then processed together.

In some embodiments, the ML platform 329, as described with respect to FIG. 3, may be used to train and/or implement OCR processing model(s). In a non-limiting example, computer vision algorithms may use large language models (LLM). A large language model is a language model characterized by emergent properties enabled by its large size. As language models, they work by taking an input text and repeatedly predicting the next token or word. They may be built with artificial neural networks, pre-trained using self-supervised learning and semi-supervised learning, typically containing tens of millions to billions of weights. In some aspects, LLM includes Natural Language Processing (NLP). Natural language processing is an interdisciplinary subfield of linguistics, computer science, and artificial intelligence concerned with the interactions between computers and human language, in particular how to program computers to process and analyze large amounts of natural language data. The goal is a computer capable of "understanding" the contents of images, including the contextual nuances of the language within them. The technology can then accurately extract information and insights contained in the images as well as categorize and organize the images or fields within images themselves.

Therefore, the technology described herein solves one or more technical problems that exist in the realm of online computer systems and in particular, with automated remote check deposit processes that unnecessarily delay availability of deposited funds or improperly process counterfeit checks. These problems are rooted in the difficulties faced by banks in determining whether an electronic image of a check depicts a counterfeit check, since banks do not have physical access to the check to verify certain characteristics that indicate a valid check (e.g., a working MICR line, proper paper thickness, serrations from a tear line, etc.). Banks that operate computer systems relying on an image of a check to complete remote deposits may not be able to verify that the MICR line of a check actually contains magnetic ink. Given a more accurate electronic means of determining whether or not a check is valid based on image analysis, banks may release funds to a customer more quickly or more readily detect that a check is likely counterfeit. The technology as described herein provides an improvement in the process of evaluating check images to determine funds availability schedules or instances of attempted fraud. One or more solutions described herein are necessarily rooted in computer technology, since the conveniences of remote check deposit must be coupled with pixel-by-pixel analysis of a remotely provided image of a check to determine one or more of text content, dimensions, color data, a boundary profile, one or more feature locations, and a typeface to prevent fraud. The technology described herein reduces or eliminates the problems faced by conventional document processing methods as will be described in the various embodiments herein. While described in the context of banking, the concepts disclosed herein apply to any document image capture and transmission scenario in which the recipient does not receive a physical copy of the document but relies upon information contained therein to provide services or access to the party sending the document image (e.g., image capture of a driver's license to provide access to an online account).

FIG. 3 illustrates a funds availability system architecture 300, according to some embodiments and aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art.

As described throughout, a client device 302 (e.g., mobile computing device 102) implements remote deposit processing for one or more financial instruments, such as checks. The client device 302 may be configured to communicate with a cloud banking system 316 to complete various phases of a remote deposit as will be discussed in greater detail hereafter.

In aspects, the cloud banking system 316 may be implemented as one or more servers. Cloud banking system 316 may be implemented as a variety of centralized or decentralized computing devices. For example, cloud banking system 316 may be a mobile device, a laptop computer, a desktop computer, grid-computing resources, a virtualized computing resource, cloud computing resources, peer-to-peer distributed computing devices, a server farm, or a combination thereof. Cloud banking system 316 may be centralized in a single device, distributed across multiple devices within a cloud network, distributed across different geographic locations, or embedded within a network. Cloud banking system 316 can communicate with other devices, such as a client device 302. Components of cloud banking system 316, such as application programming interface (API) 318, file database (DB) 320, as well as backend 322, may be implemented within the same device (such as when a cloud banking system 316 is implemented as a single device) or as separate devices (e.g., when cloud banking system 316 is implemented as a distributed system with components connected via a network).

In some embodiments, mobile banking application (app) 304 may be a computer program or software application designed to run on a mobile device such as a phone, tablet, or watch. However, in a desktop application, a desktop equivalent of the mobile banking app may be configured to run on desktop computers. In some embodiments, mobile banking app 304 may be a web application, which runs in a mobile web browser rather than directly on a mobile device. Applications or apps may be broadly classified into three types: native apps, hybrid, and web apps. Native applications may be designed specifically for a mobile operating system, such as iOS or Android. Web apps may be designed to be accessed through a web browser. Hybrid apps may be built using web technologies such as JavaScript, CSS, and HTML5, and may function like web apps disguised in a native container.

Camera 308 may capture images, video, image or video streams, or a combination of any of these or future image formats. Camera 308 may capture imagery of financial instruments, such as checks, for a remote deposit process. For example, one or more check images of a check 106 may be captured for an electronic remote deposit. A customer using client device 302, operating a mobile banking app 304 through an interactive UI 306, may capture one or more images of at least a portion of a check (e.g., identifiable fields on front or back of check) with camera 308. In some embodiments, the images may be stored (e.g., at least temporarily) in computer memory. For example, check images may be stored locally in image memory 312, which may be, but is not limited to, a frame buffer, a video buffer, a streaming buffer, a virtual buffer, or permanent memory.

Mobile banking app 304, resident on client device 302, may include a computer instruction set to provide a secure mobile device banking session. Mobile banking app 304 may allow a customer to interact with their bank account information. For example, common functions may include, but are not limited to, checking an account balance, transferring money between accounts, paying bills, making deposits, to name a few.

In some embodiments, as illustrated in FIG. 3, an image processing system 310 may be resident on the client device 302. The image processing system 310 may process the captured and/or stored imagery to extract data from the imagery by identifying specific data located within sections of the check to be electronically deposited. In one non-limiting example, single identifiable fields, such as the payer name 202, MICR line 220 identifying payer and bank information (e.g., bank name, bank routing number, payer account number, and check number), date field 208, check amount 212 and written amount 214, and authentication (e.g., payee signature 222) and anti-fraud 224 (e.g., watermark), etc. may be sequentially processed by an OCR program and/or OCR ML model within image processing system 310, as shown in FIG. 5. Alternatively, or in addition, all identifiable check fields may be processed simultaneously by the OCR program and/or OCR ML model. In one non-limiting example, identifiable fields may be captured substantially within expected physical locations (e.g., boxes) on the front or back side of the check. In another non-limiting example, pixels from a mobile device camera frame buffer, that include a perimeter of an expected payer signature 218 box, or slightly outside of the perimeter of the box (e.g., some signatures may exceed the expected perimeter), may be communicated to a remote image processing system including an OCR program and/or OCR ML model. In some embodiments, rather than image processing system 310 being resident on client device 302, some or all of image processing system 310 may be resident on cloud banking system 316. In some embodiments, portions of image processing system 310 may be resident on client device 302 while other portions of image processing system may be resident on cloud banking system 316.

In some embodiments, in addition to performing OCR processing, image processing system 310 may perform image processing to determine check characteristics, as described with respect to FIG. 5. The check characteristics may include one or more of dimensions, color data, a boundary profile, feature location, and typeface. The check characteristics may also include text content, which can be obtained using OCR processing.

Account identification 314 may use single or multiple level login data from mobile banking app 304 alone or in combination with customer identifier information extracted during the OCR process to identify a customer's account.

In some embodiments, for example, when image processing system 310 is at least partially resident on client device 302, image processing system 310 may communicate data extracted from a check image to cloud banking system 316. For example, the extracted data may be communicated to file database (DB) 320 either through a mobile app server 332 or mobile web server 334 depending on the client device (e.g., mobile or desktop).

In some embodiments, backend 322 may include one or more system servers processing banking deposit operations in a secure closed loop. These one or more system servers may operate to support client device 302. API 318 may be an intermediary software interface between mobile banking app 304, installed on client device 302, and one or more server systems, such as, but not limited to the backend 322, as well as third party servers (not shown). The API 318 may be available to be called by mobile clients through a server, such as a mobile edge server, within cloud banking system 316. File DB 320 may store files received from the client device 302 or generated as a result of processing a remote deposit.

Profile module 324 may retrieve customer profiles associated with the customer from a registry after extracting customer data from front or back images of the financial instrument. Customer profiles may be used to determine deposit limits, historical activity, security data, or other customer related data. For example, the data on check dates, check amounts, and/or payers associated with a customer and described herein may be stored and retrieved by profile module 324.

Validation module 326 may generate a set of validations including, but not limited to, any of: mobile deposit eligibility, account, image, transaction limits, duplicate checks, amount mismatch, MICR, multiple deposit, etc. While shown as a single module, the various validations may be performed by, or in conjunction with, the client device 302, cloud banking system 316 or third party systems or data.

Customer Accounts 328 (consistent with customer account 408) may include, but is not limited to, a customer's financial banking information, such as individual, joint, or commercial account information, balances, loans, credit cards, account historical data, etc.

ML platform 329 may include a trained OCR or other image processing model and/or a ML engine to train image processing ML model(s), including ML OCR model(s), used to extract and process OCR data, dimensions, color data, a boundary profile, one or more feature locations, and/or a typeface from an image of a check.

When a funds availability schedule has been generated, it may passed back to the client device 302 through API 318, where it may be formatted for communication and display on client device 302 by mobile banking app 304 through UI 306. The UI may instantiate the funds availability schedule as images, graphics, audio, additional content, etc.

Figure 6:
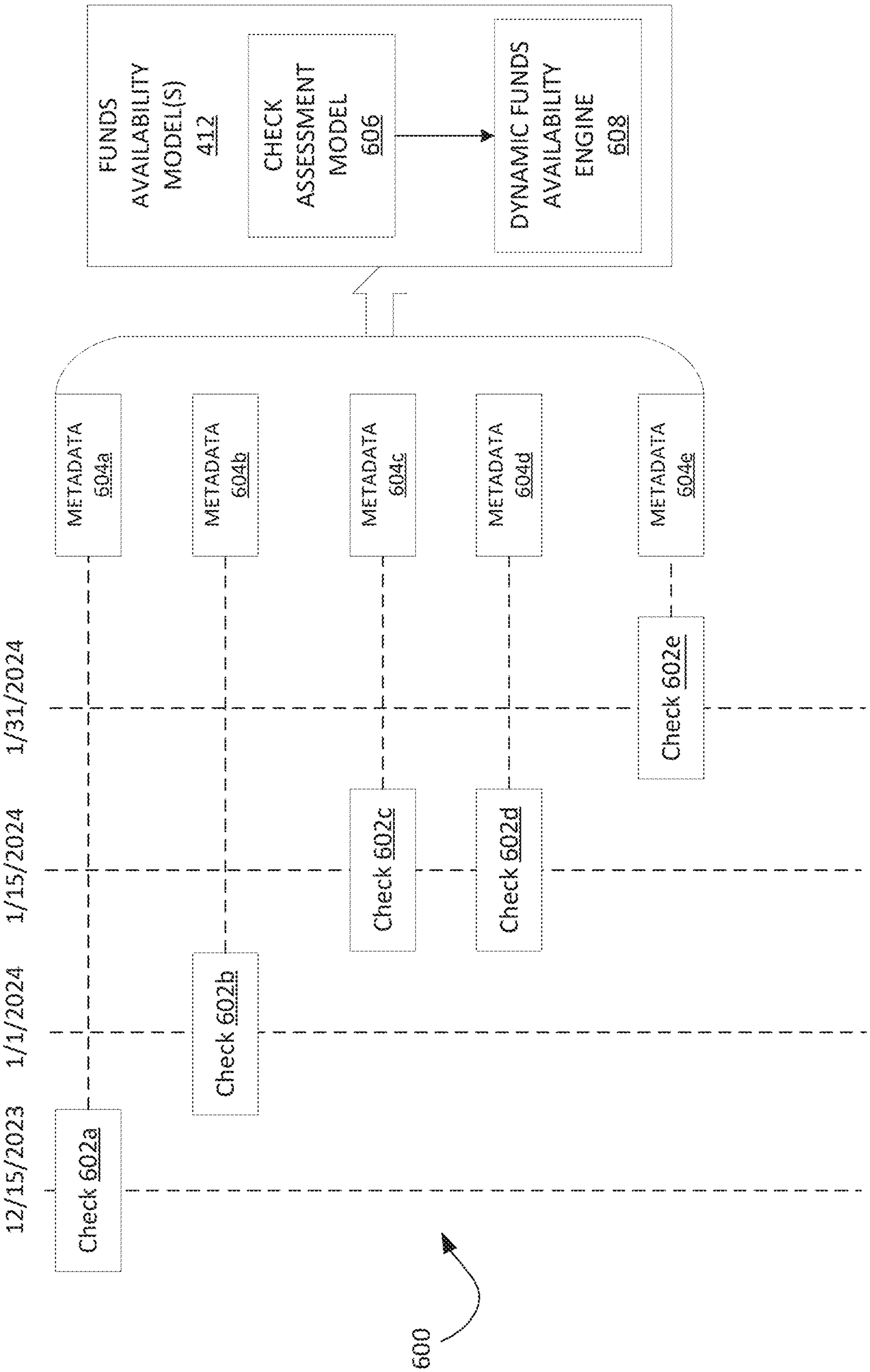
FIG. 6 illustrates a block diagram for an example funds availability system, according to some embodiments and aspects.

Pending deposit 330 may include a profile of a potential upcoming deposit(s) as determined by a dynamic funds availability engine, as described with respect to FIG. 6. If the deposit is successful, the system may create a record for the transaction and this function may retrieve a product type associated with the account, retrieve the interactions, and create a pending check deposit activity entry.

Alternatively, or in addition, to the configurations described above, one or more components of the remote deposit system may be implemented within the client device, third party platforms, the cloud-based banking system 316, or distributed across multiple computer-based systems.

FIG. 4 illustrates an example flow diagram of a remote deposit system, according to some embodiments and aspects. The remote deposit flow 400 may include one or more system servers processing banking deposit operations in a secure closed loop. While described for a mobile computing device, desktop solutions may be substituted without departing from the scope of the technology described herein. These system servers may operate to support mobile computing devices from the cloud. It is noted that the structural and functional aspects of the system servers may wholly or partially exist in the same or different ones of the system servers or on the mobile device itself. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 4, as will be understood by a person of ordinary skill in the art.

In some embodiments, a bank customer using client device 302 (e.g., mobile computing device 102), operating a mobile banking app 304, may capture one or more images of at least a portion of a check with a camera on client device 302. The client device 302 may temporarily store the imagery in local memory (e.g., frame buffer) and may process the captured imagery using a client device 302 resident image processing system 310. Alternatively, or in addition, the client device may transmit the one or more captured images to a backend system (e.g., cloud banking system 316) for processing. In some embodiments, the camera may be remote to client device 302. In an alternative embodiment, the remote deposit may be implemented on a desktop computing device.

Image processing system 310 may communicate one or more data fields and/or check characteristics extracted in an image processing operation to funds availability model(s) 412. For example, image processing system 310 may communicate one or more of a date associated with a check (e.g., an issue date), an amount of a check, the contents of a MICR line, dimensions of a check, color data, text content, a boundary profile, one or more feature locations, and a typeface. Based on one or more items of such data, a funds availability model 412 may compute a likelihood that a check corresponds to common deposit activity. For example, the funds availability model 412 may compute a confidence score indicating the likelihood that the check corresponds to common deposit activity (e.g., is a paycheck).

In some embodiments, funds availability model(s) 412 may include a first model (e.g., check assessment model 606 discussed with respect to FIG. 6) that implements the described comparison of data associated with a customer check to data associated with past checks deposited by the customer to determine the likelihood that the check corresponds to common deposit activity. Based on the comparison, the first model may determine that the check represents a high likelihood of correspondence, and a funds availability engine may determine that funds associated with the check may be released to the customer in an expedited manner, for example, instantly (meaning in real time as a response to the customer capturing an image and/or submitting a deposit request in mobile banking app 304, before the customer closes mobile banking app 304). In such embodiments, remote deposit flow 400 may bypass a second model which may conduct a more in-depth analysis of check data and/or user history to determine a funds availability schedule. Alternatively, the first model may conclude that a high enough degree of correspondence has not been identified, such that data associated with the customer check should be forwarded to the second model to determine a funds availability schedule. In some embodiments, funds availability model(s) 412 may include no second model.

In some embodiments, the first model may be at least partially resident on client device 302, for example, within mobile banking app 304. In such embodiments, the first model may retrieve data from file DB 320 and/or DB 718 (described with respect to FIG. 7). In some embodiments, the first model may be at least partially resident on cloud banking system 316, for example, in validation module 326 or ML platform 329.

As noted above, funds availability model(s) 412 may include a second model, for example, an ML model. In some embodiments, image processing system 310 may communicate one or more data fields extracted in an OCR operation to the second model, which may be an ML funds availability model processed by ML platform 329. For example, image processing system 310 may communicate one or more of customer data (e.g., name, address, and/or account number), bank information (e.g., routing number), check number, check amount (e.g., funding amount needed), authorization and anti-fraud information (e.g., signature verifications, watermark or other check security imagery), etc.

ML platform 329 may compute a funds availability schedule using the second model and based on one or more of the received data fields, customer history received from a customer account 408, bank funding policies, legal requirements (e.g., state or federally mandated limits and reporting requirements, etc.), or typical schedules stored within the second model, to name a few. This process is described in U.S. application Ser. No. 18/509,748, filed Nov. 15, 2023 and titled "Deposit Availability Schedule," the disclosure of which is incorporated by reference in its entirety. Customer account 408 may include, but is not limited to, a customer's financial banking information, such as individual, joint, or commercial account information, balances, loans, credit cards, account historical data, etc. The customer account 408, for the purposes of this disclosure, may be the payee's account, the payer's account, or both. For example, a payee customer's account 408 historical information may be used to calculate a payee's funds availability schedule, while a payer customer's account 408 may be checked for funds to cover the check amount. In one non-limiting example, an address may be checked against the current address found in a data file of customer account 408. In another non-limiting example, OCR processing may include checking a signature file within customer account 408 to verify the payee or payer signatures. Additional known OCR post processing techniques may be substituted without departing from the scope of the technology described herein.

In a non-limiting aspect, a better customer history (e.g., larger average daily balance, higher credit history, etc.) may lead to an earlier or larger funds availability, whereas a poor customer history may represent a risk and delay or reduce funds availability. As such, based on an analysis of other customer's historical actions and funds availability calculations, a dynamically generated funds availability schedule may be generated that is customized to the customer or to a customer of a similar profile. But again, in some cases, use of the second model may be bypassed if the first model indicates a high likelihood that a customer check corresponds to common deposit activity. Early access to the customer's account may also provide a verified customer for security purposes to eliminate or reduce fraud early in the remote deposit process.

In various aspects, the funds availability schedule may be generated by ML platform 329. For example, an ML funds availability model may be trained to process the received data fields, customer history, etc., as previously described.

Funds availability model(s) 412 may communicate, via mobile banking app 304 and/or remote deposit platform 410, a funds availability schedule to the customer. The funds availability schedule may be generated based on the results of the first model or the second model. The funds availability schedule may be communicated to and rendered on-screen of the customer's device within one or more UI's of the customer device's mobile banking app 304. The rendering may include imagery, text, or a link to additional content. For example, if the first model has determined, based on data associated with an image of a check, that the check has a high likelihood of corresponding to common deposit activity, the funds availability schedule may include a message such as, "We have received your deposit. Your funds are now available," or any similar message. The UI may instantiate the funds availability schedule as images, graphics, audio, etc.

One or more of the funds availability model(s) 412 may be implemented within the customer device (e.g., client device 302), third party platforms, a cloud-based system (e.g., cloud banking system 316), or distributed across multiple computer-based systems. For example, in one embodiment, the first funds availability model 412 may be implemented within cloud banking system 316 and/or on client device 302 while the second funds availability model 412 may be implemented within cloud banking system 316 and/or a third party platform.

FIG. 5 illustrates an example diagram of a client device 302, according to some embodiments. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 5, as will be understood by a person of ordinary skill in the art.

In some embodiments, the mobile banking app 304 may opened on the client device 302 and the check deposit function may be selected to initiate a remote deposit process. A camera may be activated (e.g., camera 502) to communicate a live stream of imagery (e.g., frames of video) from a field of view of the camera 502. Camera 502 may output, for display at client device display 506, a frame (e.g., an image frame or a frame of a video, for example) having one or more images (e.g., images of real-world objects) that are viewable by camera 502. An image frame may include one or more images that may represent one or more real-world objects. For instance, an image may represent an entire group of checks in a field of view of camera 502, or the image may represent one or more individual objects within the group. In some embodiments, an image of decodable check indicia may be provided by a raw image byte stream or by a byte array, a compressed image byte stream or byte array, and/or a partial compressed image byte stream or byte array.

The customer of the client device 302 may view the live stream of imagery on a UI of the client device display 506, after buffering in buffer 504 (e.g., frame buffer, video buffer, etc.). In some embodiments, the live stream may be communicated to image processing system 310 as a raw image live stream. In some embodiments, the raw image live stream may be first converted to a byte array and then communicated to image processing system 310 (buffered or not buffered). The data embedded in the byte stream or byte array may then extracted by program instructions of an OCR program 508 and/or feature detection program(s) 512 of image processing system 310 and saved to memory of the client device 302. This extracted data may be continuously transmitted, periodically transmitted, or transmitted after completion of image processing (e.g., after all data fields and check characteristics are extracted) to mobile banking app 304 and/or a cloud banking system 316 via a network connection. In some embodiments, the extracted data may be sent to cloud banking system 316 by mobile banking app 304 with an image frame or image frames from which the data was extracted. In some embodiments, the extracted data may be stored in a metadata file that may be sent with the image frame or image frames.

In some embodiments, the remote deposit platform 410, as described with respect to FIG. 4, may be used to assist implementation of the localized mobile device image processing. In a non-limiting example, computer vision algorithms may use large language models (LLM). A large language model is a language model characterized by emergent properties enabled by its large size. As language models, they work by taking an input text and repeatedly predicting the next token or word. They may be built with artificial neural networks, pre-trained using self-supervised learning and semi-supervised learning, typically containing tens of millions to billions of weights. In some aspects, LLM includes Natural Language Processing (NLP). One goal is a computer capable of "understanding" the contents of images, including the contextual nuances of the language within them. The technology can then accurately extract information and insights contained in the images as well as categorize and organize the images or fields within images themselves. LLM and NLP functionality may be implemented on the remote deposit platform 410 to train and improve a ML OCR model 510 that may be operative with the mobile device for localized active OCR processing.

In some embodiments, the front side imagery may be processed followed by the back side imagery. Alternatively, the front side and back side imagery may be processed together or in parallel.

In some embodiments, feature detection program(s) 512 can include one or more programs for processing an image of a check to determine one or more check characteristics, which may include dimensions, color data, text content, a boundary profile, one or more feature locations, and typeface. In some embodiments, text content may be determined using OCR program 508 or OCR ML model 510 rather than feature detection program(s) 512.

Example methods for determining these check characteristics will now be described. However, these examples are not meant to limit this disclosure to any particular methods for determining the below characteristics. The below characteristics may be determined by feature detection program(s) 512 in any manner as known in the art.

Dimensions: In some embodiments, "dimensions" of a check can refer to real world length and/or width of a check. In some embodiments, real world length and width of a check may be determined by leveraging augmented reality (AR) capabilities of client device 302. For example, mobile banking app 304 may interact with an AR platform on client device, within which an AR framework such as ARKit (IOS) or ARCore (Android) may operate. The AR platform may include software (e.g., feature detection program(s) 512) and internal sensors (e.g., gyroscopes, accelerometers, magnetometers, and/or LiDAR sensors, ToF sensors, etc.) that can determine a real world position and orientation of various objects within the field of view of camera 502 both relative to a real world coordinate system and relative to camera 502, as described in more detail in U.S. patent application Ser. No. 18/529,623, filed Dec. 5, 2023 and titled "Augmented Reality Data Capture Aid," the disclosure of which is incorporated by reference in its entirety. Using the AR platform, mobile banking app 304 may obtain data on the real world length and width of a plane (e.g., check 106) detected in the field of view of camera 502, for example, by leveraging plane detection and requesting plane extent data from the AR platform.

Color data: In some embodiments, "color data" may refer to data describing the color of a particular pixel along with data describing a real world location on a check, relative to the center point or a boundary of the check, depicted by the pixel. The data describing the color of the particular pixel may be in the form of an RGB code, a HEX color code, a CMYK code, an HSL code, an HSB code, etc. In some embodiments, the color data may be extracted from a byte array representing an image. In some embodiments, the data describing the location on the check that the pixel depicts can be determined from the location of the pixel on the check as shown in the image along with data on tilt and skew of camera 502 relative to the check at the time of image capture, which can be used to determine the real world location on the check, relative to the center point or boundary, that the pixel depicts. The data on tilt and/or skew of camera 502 may be gathered at least in part from internal sensors (e.g., accelerometers, gyroscopes, and/or magnetometers) within client device 302 at the time of image capture.

In some embodiments, the color data may be normalized (e.g., standardized across various image capture lighting conditions) based on metadata associated with the image capture, for example, exposure data that may be maintained in an EXIF file accompanying the captured image.

Boundary profile: In some embodiments, a "boundary profile" may refer to the real world 2D shape of the check. As for dimension data, in some embodiments, the boundary profile may be determined by leveraging AR capabilities of client device 302. For example, an AR platform as described above may identify check 106 as a plane and provide data on the coordinates of the vertices of the plane in a real world coordinate system such as that described in U.S. patent application Ser. No. 18/529,623, filed Dec. 5, 2023 and titled "Augmented Reality Data Capture Aid," the disclosure of which is incorporated by reference in its entirety. Mobile banking app 304 may convert the coordinates into any representation of the shape of the check (which may include, for example, real world lengths of sides of the check and/or angles of sides relative to one another).

In some embodiments, determination of a boundary profile can include determination of whether the boundary of a check includes serrations (e.g., from a tear line). In some embodiments, the determination of whether the boundary of the check includes serrations can include a comparison of a color of the check with a color of the background in an image. The comparison may be performed by comparing pixel data (e.g., RGB values) of adjacent pixels to identify portions of the boundary between the check and the background. For example, regions in which RGB values generally within first ranges transition to RGB values generally within second ranges may be identified as portions of the boundary of the check, so long as the second ranges include RGB values of pixels near the edge and/or corners of the image. Feature detection program(s) 512 may be configured to trace and/or map the portions of the boundary of the check (e.g., by cataloging the positions of pixels on the boundary within the image) and measure angle(s) between portions of the boundary. In some embodiments, feature detection program(s) 512 may compare the angle(s) to one or more predetermined thresholds (e.g., 10 degrees). In some embodiments, in response to the angle(s) exceeding a predetermined threshold, feature detection program(s) 512 may determine that the boundary includes serrations.

Feature location: In some embodiments, "feature location" may refer to the real world location of a feature (e.g., an identifiable field, a character, a line, a logo, a watermark, etc.) on a check. As for dimension and boundary profile data, in some embodiments, feature location may be determined by leveraging AR capabilities of client device 302. For example, an AR platform as described above may identify feature points on check 106. These feature points may be tied to distinctive features within images, for example, corners, dots, or other patterns, as described in U.S. patent application Ser. No. 18/529,623, filed Dec. 5, 2023 and titled "Augmented Reality Data Capture Aid," the disclosure of which is incorporated by reference in its entirety. The AR platform may determine real world coordinates of feature points on check 106. Mobile banking app 304 may convert the real world coordinates to coordinates in an object coordinate system tied to the check (e.g., with a center point of the check as the object coordinate system's origin) to create a "map" of feature points that represent a check.

Typeface: In some embodiments, "typeface" refers to a font or fonts that are used on a check. In some embodiments, the font or fonts used on a check may be determined by providing an image of the check to an ML classification model (i.e., one of feature detection program(s) 512). In some embodiments, the ML model may have been trained on images (not necessarily check images) including a variety of fonts by using supervised learning; the images may have been labeled with the font(s) included in the images before the images were provided to the untrained ML model. In such embodiments, the ML model may be run on cloud banking system 316 rather than client device 302.

In addition or alternatively to the embodiments described above, one or more of the check characteristics described herein may be determined using multiple lenses and/or cameras on client device 302. For example, data from each of multiple lenses and/or cameras may be compared to obtain depth data (e.g., real world distance from a device to a check or feature depicted in an image) that may be used to determine dimensions, boundary profile, and/or feature location.

In some embodiments, feature detection program(s) 512 and/or OCR program 508 may determine one or more of the above check characteristics. In some embodiments, mobile banking app 304 and/or a program running on cloud banking system 316 may be configured to associate the one or more check characteristics with an image frame or image frames captured using camera 502. The one or more check characteristics may be stored with the associated image frame or image frames in a database, for example, file DB 320 (or database 718 described with respect to FIG. 7). In some embodiments, the one or more check characteristics may be stored without storing an image frame or image frames.

In some embodiments, feature detection program(s) 512 may include programs for determining all of the above check characteristics. In some embodiments, feature detection program(s) 512 may include programs for determining any subset of the above check characteristics, for example, dimensions, boundary profile, and feature location.

While shown on client device 302 in FIG. 5, in some embodiments, one or more of OCR program 508, ML OCR model 510, and feature detection program(s) 512 may reside anywhere within remote deposit system architecture 300 shown in FIG. 3, for example in validation module 326 and/or ML platform 329. Additionally, in some embodiments, one or more of OCR program 508, OCR ML model 510, and feature detection program(s) 512 may reside on a third party platform. The location of these models and programs should not limit the scope of the present disclosure, as the image processing functions performed by image processing system 310 and described herein may be performed on any software platform upon the provision of a check image to one or more components of image processing system 310. For example, in some embodiments, one or more of the image processing functions described herein (e.g., OCR or detection of any of the check characteristics) may be performed in real time at client device 302 based on image frames received from camera 502. Likewise, alternatively or additionally, one or more of the image processing functions described herein may be performed at cloud banking system 316 based on an image or multiple images collected by camera 502 and uploaded to cloud banking system 316 by mobile banking app 304.

In some embodiments, all of feature detection program(s) 512 may reside on client device 302. In some embodiments, a subset of feature detection program(s) 512 may reside on client device 302 while another subset of feature detection program(s) 512 may reside on cloud banking system 316 and/or a third party platform. In some embodiments, all of feature detection program(s) 512 may reside on cloud banking system 316 and/or a third party platform.

FIG. 6 illustrates an example customer deposit pattern 600 and deposit pattern analysis infrastructure. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 6, as will be understood by a person of ordinary skill in the art.

In some embodiments, the customer deposit pattern may include a plurality of checks 602, for example check 602*a*, check 602*b*, check 602*c*, check 602*d*, and check 602*e*. The plurality of checks may each be associated with a date, for example, an issue date. As used herein, "issue date" refers to a date printed or written on the check that indicates the date the payer authorizes funds to be transferred from the payer to the payee. As shown in FIG. 6, check 602*a* may be associated with an issue date of Dec. 15, 2023, check 602*b* may be associated with an issue date of Jan. 1, 2024, checks 602*c-d* may be associated with an issue date of Jan. 15, 2024, and check 602*e* may be associated with an issue date of Jan. 31, 2024. However, checks 602 may be associated with any issue dates. While the issue date is specifically identified herein, other dates associated with a check 602 may be used, such as the date the check 602 is submitted for remote deposit. Checks 602 represent checks that have been submitted by a customer for mobile deposit over a given time period.

In some embodiments, each of checks 602 may be associated with metadata 604. Metadata 604 may include one or more of OCR identified data (e.g., issue date, MICR, check amount) and the check characteristics discussed herein (e.g., a real world dimension of a check, color of a particular real world portion of the check, a particular word or phrase on the check, a boundary shape of the check, a real world location of a feature on the check, or a typeface of text on the check). In some embodiments, metadata 604 may be compiled into a metadata file that may be stored and/or transferred with an image or images of a check or by itself. As shown in FIG. 6, check 602*a* may be associated with metadata 604*a*, check 602*b* may be associated with metadata 604*b*, check 602*c* may be associated with metadata 604*c*, check 602*d* may be associated with metadata 604*d*, and check 602*e* may be associated with metadata 604*e*.

As shown in FIG. 6, metadata 604 may be transferred to a check assessment model 606. In some embodiments, metadata 604 may be transferred to check assessment model 606 via a database (DB), such as DB 718 shown in FIG. 7. In some embodiments, check assessment model 606 may include a software implemented algorithm that analyzes metadata 604 to recognize patterns. For example, check assessment model 606 may identify, from a plurality of checks 602 (images of which have been analyzed as described above), a plurality of checks associated with a common payer, and determine a date parameter associated with the common payer and/or an amount parameter associated with the common payer, based on customer deposit patterns. In some embodiments, check assessment model 606 may identify a plurality of checks 602 associated with a common payer by analyzing MICR data within metadata 604 (i.e., an account number may indicate a payer). Alternatively, or in addition, check assessment model 606 may identify a plurality of checks 602 associated with a common payer by analyzing text content within metadata 604 (e.g., to identify a business or personal name and/or address).

In some embodiments, check assessment model 606 may sort checks submitted for deposit by payer. In some embodiments, check assessment model 606 may recognize when a threshold number of checks from a common payer has been met within a predetermined timeframe. In some embodiments, the threshold number can range from 3 to 50 checks, including subranges, within any predetermined timeframe. For example, in some embodiments, the threshold number can range from 5 to 40 checks, from 5 to 30 checks, from 5 to 20 checks, from 5 to 15 checks, or from 5 to 10 checks, within any predetermined time frame. For each of the ranges above, the predetermined timeframe can range from 1 month to 2 years, including subranges. For example, in some embodiments, the predetermined timeframe can range from 1 month to 1.5 years, from 1 month to 1 year, from 1 month to 9 months, from 1 month to 6 months, or from 1 month to 3 months. In some embodiments, when the threshold number of checks from the common payer has been met, check assessment model 606 may add the common payer to a "trigger list." The trigger list may include payers for which check assessment model 606 may perform additional analysis if it determined that a future check 602 is associated with one of the payers on the trigger list.

In some embodiments, the additional analysis may include whether a date associated with the future check 602 corresponds to a date parameter. In some embodiments, check assessment model 606 may determine a date parameter associated with a common payer. The date parameter may be determined based on issue date information included in metadata 604 (e.g., extracted via OCR processing). The date parameter may be determined based on a length of time between the issue dates of checks associated with the common payer. For example, in some embodiments, check assessment model 606 may determine that, on average, checks from the common payer are issued about every 15 days. Variability may exist; for example, check assessment model 606 may determine that check 602*b*, issued, as an example, on Jan. 1, 2024 by the common payer, was issued 17 days after check 602*a*, issued, as an example, on Dec. 15, 2023 by the common payer. In contrast, check assessment model 606 may determine that check 602*c*, issued, as an example, on Jan. 15, 2024 by the common payer, was issued 14 days after check 602*b*. These timeframes are exemplary; check assessment model 606 may determine any average time between the issuance of checks from a common payer.

In some embodiments, the date parameter may be determined by analyzing images of checks (e.g., to obtain issue date data) associated with a common payer that are submitted for deposit by a single customer. In alternative embodiments, the date parameter may be determined by analyzing images of checks associated with a common payer that are submitted for deposit by multiple customers through multiple customer accounts 408. This may be useful, for example, when a common payer issues paychecks on a regular schedule that does not vary from customer to customer of remote deposit system 300. In some embodiments, the date parameter may be determined based on issue date information gathered from other sources and input into check assessment model 606. For example, information available online and/or from payroll processing companies regarding paycheck issuance schedules may be used by check assessment model 606 to calculate the date parameter.

In some embodiments, the date parameter may indicate an expected range of dates of issuance of a check from the common payer. For example, the date parameter may be a timeframe in which it is expected, based on past deposit patterns, that a single check from the common payer will be issued. In some embodiments, the timeframe may be measured from the issue date of the last check from the common payer that has been deposited. Accordingly, in some embodiments, the date parameter may be a range of a number of days, for example, 14-17 days. But the range of the number of days is likely different depending on the common payer. For example, in the case of checks associated with the common payer being paychecks, the range may be lower for an employee who is paid weekly rather than bi-weekly.

Alternatively, or in addition, the additional analysis performed by check assessment model 606 on the future check 602 may include whether an amount of the check 602 corresponds to an amount parameter. In some embodiments, check assessment model 606 may determine an amount parameter associated with a common payer. The amount parameter may be determined based on amount information included in metadata 604 (e.g., extracted via OCR processing). The amount parameter may be determined based amounts of checks associated with the common payer for transactions with the customer. For example, in some embodiments, check assessment model 606 may determine that, on average, checks from the common payer to the customer are for $3,000. Variability may exist; for example, check assessment model 606 may determine that check 602*b*, issued, as an example, by the common payer, is for $3,500 while check 602*c*, issued, as an example, by the common payer, is for $2,500. These amounts are exemplary; check assessment model 606 may determine any average amount of checks from a common payer to the customer.

In some embodiments, the amount parameter may indicate an expected range of amounts of a check from the common payer to the customer. For example, in some embodiments, the amount parameter may be a range of amounts expected in a single deposit based on past deposit patterns. For example, the amount parameter may be $2,500-$3,500. But the range of amounts is likely different for each common payer and for each customer. For example, in the case of the checks associated with the common payer being paychecks, the range may be lower for an employee who is paid weekly rather than bi-weekly.

In some embodiments, the date parameter and the amount parameter may be determined by check assessment model using statistical analysis. For example, the date parameter may be determined by calculating a mean time (e.g., number of days) between check issuances by the common payer and setting the date parameter to include any date within one standard deviation (or within more standard deviations) of the mean time. In some embodiments, the date parameter may simply be the mean time. Likewise, the amount parameter may be determined by identifying a mean amount of common payer checks and setting the amount parameter to include any amount within one standard deviation (or within more standard deviations) of the mean amount. In some embodiments, the amount parameter may simply be the mean amount.

In some embodiments, the standard deviation of the time between check issuances and/or the standard deviation of the amount may be used to remove or add the common payer to the trigger list. Since the standard deviation is a measure of the variability of data, high standard deviations may indicate that checks, though associated with a common payer, are not likely to be associated with regular deposit patterns. Likewise, low standard deviations may indicate that checks associated with a common payer correspond with regular deposit patterns (e.g., paycheck deposits).

Alternatively, or in addition, the additional analysis performed by check assessment model 606 on the future check 602 may include whether a plurality of check characteristics correspond to one or more payer-specific check characteristics. In some embodiments, check assessment model 606 may determine one or more payer-specific check characteristics associated with a common payer. The one or more payer-specific check characteristics may be determined based on check characteristics data included in metadata 604. The one or more payer-specific check characteristics may be determined based on check characteristics data of checks associated with the common payer.

In some embodiments, check assessment model 606 may determine a percentage of checks associated with the common payer that include a check characteristic. The check characteristic can be, for example, a real world dimension of a check, color of a particular real world portion of the check, a particular word or phrase on the check, a boundary shape of the check, a real world location of a feature on the check, or a typeface of text on the check. Check assessment model 606 may determine, as a non-limiting example, that 100% of checks associated with a common payer (e.g., Kroger) include the word "Kroger," that 90% of checks associated with the common payer use Arial font, and/or that 85% of checks associated with the common payer have a serrated bottom edge. Check assessment model 606 may use the percentages in calculating a confidence score indicating a likelihood that a future check 602 corresponds to common deposit activity, as discussed below.

In some embodiments, check assessment model 606 may determine a percentage of checks associated with the common payer that each simultaneously include a plurality of check characteristics. As a non-limiting example, check assessment model 606 may determine that 80% of checks associated with a common payer (e.g., Kroger) include the word "Kroger," use Arial font, and have a serrated bottom edge.

In some embodiments, check assessment model 606 may determine the one or more payer-specific check characteristics based on the percentage(s) of checks associated with the common payer that include a check characteristic or a plurality of check characteristics. For example, check assessment model 606 may determine or be provided a threshold percentage. In some embodiments, any check characteristic included in a percentage of checks that meets the threshold percentage may be determined to be a payer-specific check characteristic. In such embodiments, the one or more payer-specific check characteristics may include any check characteristic included in a percentage of checks that meets the threshold percentage. Similarly, in some embodiments, any plurality of check characteristics simultaneously included in a single check in a percentage of checks that meets the threshold percentage may be determined to be a plurality of payer-specific check characteristics. In such embodiments, the one or more payer-specific check characteristics may include any plurality of check characteristics simultaneously included in a single check in a percentage of checks that meets the threshold percentage In some embodiments, the threshold percentage may range from 10% to 100%, including subranges. For example, the threshold percentage may range from 20% to 100%, from 30% to 100%, from 40% to 100%, from 50% to 100%, from 60% to 100%, from 70%, to 100%, from 80% to 100%, 90% to 100%, from 85% to 99%, from 90% to 98%, or from 95% to 97%. In some embodiments, no threshold percentage may exist, and any characteristic included in a check associated with a common payer may be considered a payer-specific check characteristic. In such embodiments and in any of the embodiments described above, check assessment model 606 may store with identified check characteristics the percentages of checks associated with the common payer that include the identified check characteristics, such that the check assessment model 606 may use the percentages in calculating a confidence score, as discussed below.

In some embodiments, the one or more payer-specific check characteristics may be determined by analyzing images of checks associated with a common payer that are submitted for deposit by a single customer. In alternative embodiments, the one or more payer-specific check characteristics may be determined by analyzing images of checks associated with a common payer that are submitted for deposit by multiple customers through multiple customer accounts 408. This may be useful, for example, when a common payer issues paychecks having similar or identical characteristics, which do not vary from customer to customer of remote deposit system 300. In some embodiments, the one or more payer-specific check characteristics may be determined by analyzing images of checks or information on checks associated with a common payer that is retrieved from other sources, for example, payroll processing companies. For example, once a common payer has been identified as described above, check assessment model 606 may retrieve data linking the common payer to a particular payroll processing company and check characteristic data associated with checks issued by the payroll processing company (e.g., dimensions, color data, text content, a boundary profile, one or more feature locations, and/or typeface). The data linking the common payer to a particular payroll processing company and associated check characteristic data may be stored in a database, for example, file DB 320 and/or DB 718 discussed with respect to FIG. 7.

In some embodiments, the one or more payer-specific check characteristics may indicate expected characteristics of a check from the common payer. For example, in some embodiments, the one or more payer-specific check characteristics may be check characteristics expected in a single deposit of a check associated with the common payer based on past deposit patterns.

Once check assessment model 606 has determined one or more of the date parameter, amount parameter, and one or more payer-specific check characteristics associated with the common payer, check assessment model 606 may compare metadata 604 associated with any future check 602 to the date parameter, amount parameter, and/or the one or more payer-specific check characteristics. For example, check assessment model 606 may compare a date associated with a check 602 (e.g., the issue date) to the date parameter, an amount of the check 602 to the amount parameter, and/or one or more check characteristics of check 602 to the one or more payer-specific check characteristics. Check assessment model 606 may determine a level of correspondence of the date associated with the check 602 with the date parameter, a level of correspondence of the amount of the check 602 with the amount parameter, and/or a level of correspondence of the one or more check characteristics of the check 602 with the one or more payer-specific check characteristics. The level of correspondence of one or more of these comparisons may be represented in the form of a confidence score, as discussed in more detail below.

In some embodiments, check assessment model 606 may provide the level of correspondence obtained from one or more of these comparisons either separately or collectively (e.g., in the form of one or more confidence scores), to dynamic funds availability engine 608, which may determine a funds availability schedule. In some cases, based on the one or more confidence scores, dynamic funds availability engine 608 may determine that funds should be instantly available to the customer. In some cases, based on the one or more confidence scores, dynamic funds availability engine 608 may determine that funds should be available to the customer the same day the customer submits an image of check 602 for deposit. In some cases, based on the one or more confidence scores, dynamic funds availability engine 608 may additionally or alternatively determine that a remote deposit limit (e.g., a restriction on the amount of funds that can be deposited via remote deposit within a given time period) may be modified. For example, in response to determining a high correspondence in one or more of the above comparisons, dynamic funds availability engine 608 may increase a remote deposit limit so that the funds may be available to the customer within the same day and/or month. In some cases, based on the one or more confidence scores, dynamic funds availability engine 608 may determine that further processing is required to determine a funds availability schedule. In such cases, data associated with the check 602 may be forwarded to another funds availability model 412, for example, the funds availability ML model discussed above with respect to FIG. 4.

In some embodiments, rather than providing the level of correspondence obtained from one or more of the above comparisons, check assessment model 606 may determine that the check 602 presents a high risk of fraud (i.e., is likely counterfeit), and indicate the high risk of fraud to dynamic funds availability engine 608. In response, dynamic funds availability engine 608 may determine that the check may not be deposited via remote deposit.

As described herein, a message indicating the results determined by check assessment model 606 and/or dynamic funds availability engine 608 may be provided to the customer via UI 306.

Figure 7:
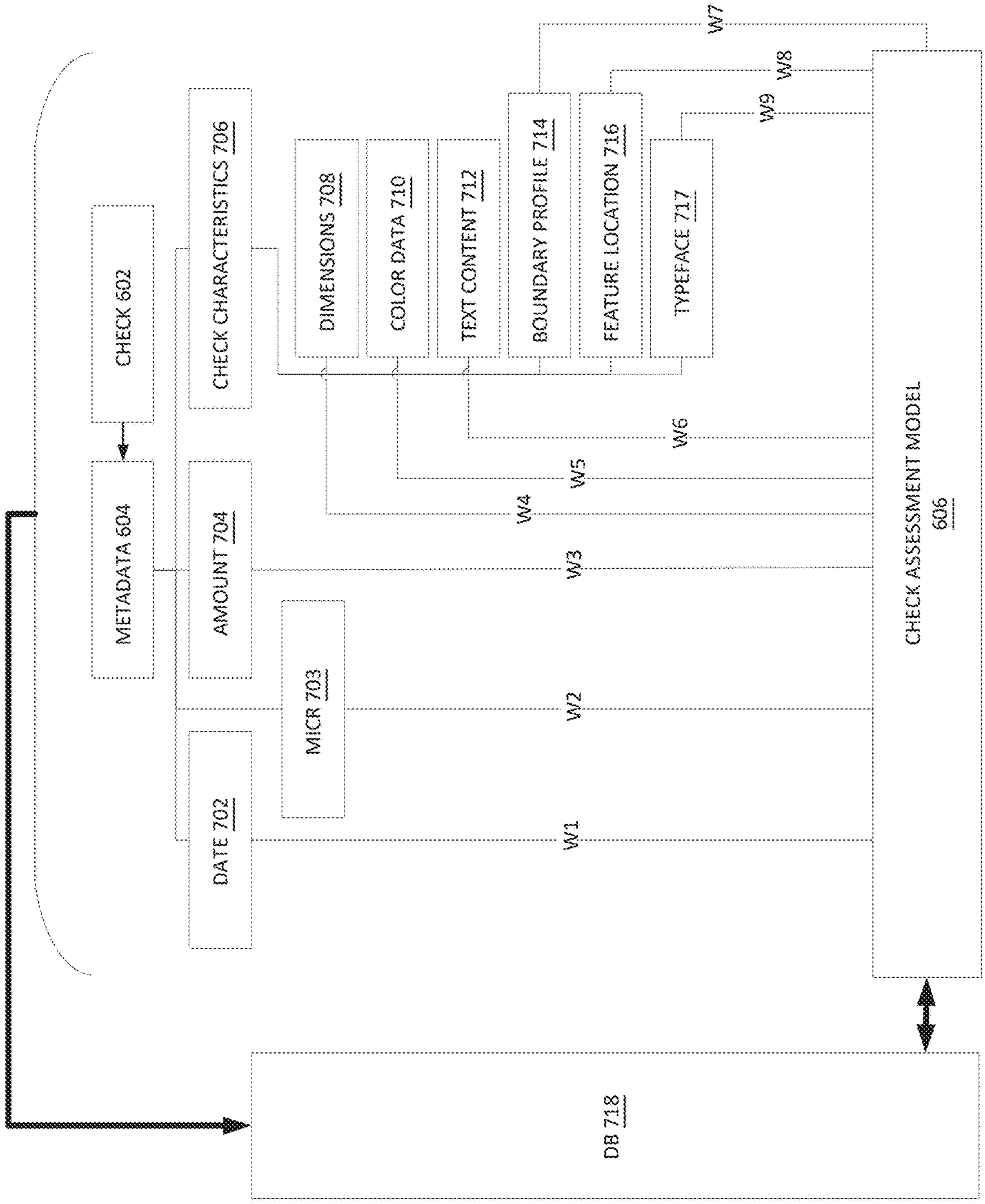
FIG. 7 illustrates a block diagram of an example check assessment system, according to some embodiments and aspects.

FIG. 7 illustrates an example flow diagram for processing a check 602. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 7, as will be understood by a person of ordinary skill in the art.

Check 602 in FIG. 7 may be any check that is being processed to determine the date parameter, amount parameter, and/or one or more payer-specific check characteristics based on metadata 604. Alternatively, or in addition, check 602 of FIG. 7 may be a check that is being processed to determine a level of correspondence of a date 702 with the date parameter, an amount 704 with the amount parameter, and/or check characteristics 706 with the one or more payer-specific check characteristics. In some embodiments, check 602 may be both. That is, data extracted from an image of check 602 (e.g., metadata 604) may be used to determine or refine the date parameter, amount parameter, and/or one or more payer-specific check characteristics, and the extracted data may be compared to data extracted from images of previous checks to determine a level of correspondence as described above.

As shown in FIG. 7, data extracted from an image of check 602 may be in the form of metadata 604. In some embodiments, metadata 604 may include one or more of a date 702 associated with check 602 (e.g., an issue date), a MICR 703 of check 602, an amount 704 of check 602, and check characteristics 706 of check 602, which may include one or more of dimensions 708, color data 710, text content 712, a boundary profile 714, one or more feature locations 716, and a typeface 717.

In some embodiments, one or more images of check 602 may be stored in a DB 718. In alternative embodiments, no image of check may be stored in DB 718, but metadata 604 without an image may be stored. DB 718 may be any suitable form of database, such as a hierarchical database, a network database, an object-oriented database, a relational database, a cloud database, a centralized database, and/or a NoSQL database. In some embodiments, DB 718 may reside on cloud banking system 316, for example, as part of file DB 320. In some embodiments, DB 718 may reside on client device 302 as part of client device 302's internal storage. In some embodiments, metadata 604 may be stored in a metadata file, which may be linked to the one or more images of check 602 and/or a deposit request and stored in DB 718. The metadata file may include one or more of the items indicated in FIG. 7.

As shown in FIG. 7, check assessment model 606 may communicate with DB 718 to retrieve and store data. For example, in some embodiments, check assessment model 606 may communicate with DB 718 to retrieve metadata associated with one or more check images, and may retrieve and store date parameters, amount parameters, and payer-specific check characteristics determined by check assessment model 606 based on the metadata.

In some embodiments, an image of a check 602 may be captured using camera 308 and processed using image processing system 310, and the extracted data fields and check characteristics (e.g., metadata 604) may be stored in DB 718. Check assessment model 606 may retrieve metadata 604 to compare it with past metadata extracted from images of checks associated with the same payer of the check 602 and/or to determine a date parameter, amount parameter, and/or one or more payer-specific check characteristics. In some embodiments, check assessment model 606 may retrieve metadata of check 602 from DB 718 in response to instructions from mobile banking app 304, which has initiated a mobile deposit of the check 602. In some embodiments, the instructions can include an identifier associated with check 602 and a location of metadata 604 associated with check 602 in DB 718.

For example, in some embodiments, once check assessment model 606 retrieves metadata 604, check assessment model 606 may determine, based on MICR 703 and/or text content 712, that check 602 is associated with a payer. Check assessment model 606 may then retrieve the date parameters, amount parameter, and one or more payer-specific check characteristics associated with the payer. Check assessment model 606 may then compare date 702 to the date parameter, amount 704 to the amount parameter, and/or check characteristics 706 to the payer-specific check characteristics. Based on the comparison(s), check assessment model 606 may compute one or more confidence scores. In some embodiments, check assessment model 606 may compute a confidence score indicating a level of correspondence of date 702 with the date parameter, a confidence score indicating a level of correspondence of amount 704 with the amount parameter, and/or a confidence score indicating a level of correspondence of check characteristics 706 with the one or more payer-specific check characteristics. In some embodiments, check assessment model 606 may compute a single confidence score indicating a level of correspondence of date 702 with the date parameter, amount 704 with the amount parameter, and a level of correspondence of check characteristics 706 with the one or more payer-specific check characteristics.

By a confidence score "indicating a level of correspondence" as used herein, it should be understood that the confidence score may be a confidence score indicating how much two items correspond (e.g., the confidence score increases when the level of correspondence increases) or may be a confidence score indicating how little two items correspond (e.g., the confidence score increases when the level of correspondence decreases). Likewise, by a confidence score "indicating a likelihood" as used herein, it should be understood that the confidence score may be a confidence score indicating how likely an event is (e.g., the confidence score increases when the likelihood increases) or may be a confidence score indicating how unlikely an event is (e.g., the confidence score increases when the likelihood decreases).

In some embodiments, for a given check 602 associated with a payer, check assessment model 606 may compute the one or more confidence scores based on one or more of the following non-limiting factors:

1. Whether date 702 falls within the date parameter associated with the payer/the difference between date 702 and the center of the date parameter associated with the payer;
2. Whether amount 704 falls within the amount parameter associated with the payer/the difference between amount 704 and the center of the amount parameter associated with the payer;
3. The percentage of checks associated with the payer in DB 718 that include a check characteristic matching a check characteristic 706 of check 602;
4. The percentage of checks associated with the payer in DB 718 that include a plurality of check characteristic matching a plurality of check characteristics 706 of check 602;
5. If text content 712 is used to identify the payer, the correspondence of an account number in MICR 703 to an account number associated with the payer as determined from previous checks associated with the payer.

In computing the one or more confidence scores, in some embodiments, check assessment model 606 may weight each item of metadata 604 equally. That is, the plurality of weights W1-W9 shown in FIG. 7 may be equal. In some embodiments, check assessment model 606 may weight some items of metadata 604 (e.g., date 702 and amount 704) equally (W1=W3) and some items of metadata 604 (e.g., dimensions 708 and feature location 716) differently (W4 W8). In some embodiments, check assessment model 606 may group items of metadata (e.g., check characteristics 706) and weight the group equally or differently with other items of metadata (e.g., date 702 and amount 704) (the sum of W4–W9=W1, W2). In some embodiments, check assessment model 606 may set one or more of weights W1-W9 to 0, such that an item of metadata 604 is not considered at all. For example, in some embodiments, check assessment model 606 may set weights W4-W9 to 0 such that only the levels of correspondence of date 702 to the date parameter and amount 704 to the amount parameter may be considered. Likewise, check assessment model 606 may set one or both of weights W1 and W3 to 0 such that only the level of correspondence of check characteristics 706 to the one or more payer-specific check characteristics is considered.

In some embodiments, check assessment model 606 may modify weights W1-W9 based on the strength of correspondence of other items of metadata 604 to past metadata associated with a payer. For example, in some embodiments, based on the level of correspondence of check characteristics 706 with the one or more payer-specific check characteristics, check assessment model 606 may reduce the weight of date 702 (W1) and amount 704 (W3). This may be useful to identify and accommodate instances in which a check is almost certain to have been issued by a payer that a customer has regularly received funds from (e.g., an employer), but the timing or amount of the check is unusual (e.g., a bonus check). In some embodiments, check assessment model 606 may modify weights W1-W9 based on a time of year or other external data. For example, check assessment model 606 may reduce weights W1 and W3 at the end or start of the year, when it is common to receive checks, such as bonus checks, that are issued at unusual times or in unusual amounts. In some embodiments, check assessment model 606 may modify weights W1-W9 based on other past deposit patterns, such as if a customer has a long history of irregular, valid deposits from a common payer, which may represent an employee who is paid irregularly.

In some embodiments, the one or more confidence scores may indicate a likelihood that check 602 corresponds with established, non-fraudulent deposit activity. For example, in some embodiments, the one or more confidence scores may indicate a likelihood that check 602 is a paycheck.

In some embodiments, the one or more confidence scores may alternatively or additionally indicate a likelihood that check 602 is a counterfeit check. For example, check assessment model 606 may determine a confidence score indicating a high level of correspondence of date 702 with the date parameter, a confidence score indicating a high level of correspondence of amount 704 with the amount parameter, but a confidence score indicating a low level of correspondence of check characteristics 706 with the one or more payer-specific check characteristics. Such a result may indicate a high likelihood the check is counterfeit, absent outside data indicating that the payer has changed check format. In some embodiments, such outside data may be included in DB 718 and accessible to check assessment model 606. Such outside data may include check characteristics determined from images of checks associated with the payer but submitted by other customers, data indicating a payroll processer for a payer (and changes thereof), and/or data indicating a payroll processor for a payer has altered a check format. While the use of outside data is described, check assessment model 606 need not rely on outside data to flag a check as a potential counterfeit check.

Similarly, check assessment model 606 may determine a confidence score indicating a high level of correspondence of date 702 with the date parameter, a confidence score indicating a low level of correspondence of amount 704 with the amount parameter (e.g., an amount far above the amount parameter), and a confidence score indicating a medium level of correspondence of check characteristics 706 with the one or more payer-specific check characteristics. Such a result may indicate a high likelihood the check is counterfeit, absent outside data indicating that the payer has changed check format. In some embodiments, as noted above such outside data may be included in DB 718 and accessible to check assessment model 606. Such outside data may include the time of year (i.e., check 602 may be a bonus check) and/or data indicating a typical issue date of bonus checks for a payer. While the use of outside data is described, check assessment model 606 need not rely on outside data to flag a check as a potential counterfeit check.

In some embodiments, check assessment model 606 may weight one or more check characteristics 706 more highly in determining whether to flag a check as a potential counterfeit check. For example, boundary profile 714 (W7) may be weighted more highly than other check characteristics 706, given that a profile boundary that diverges from typical check profile boundaries (e.g., is not rectangular) may be highly unusual for a valid check. In some embodiments, weights W1-W9, and particularly weights W4-W9, may be set based on the output of a deep learning model which analyzes metadata 604 associated with counterfeit checks and determines an extent of association between an item of metadata 604 and whether a check is counterfeit. In such embodiments, the deep learning model may operate on ML platform 329 and have access to DB 718.

In some embodiments, in determining whether to flag check 602 as a potential counterfeit check, check assessment model 606 may compare features of check 602 to other features of check 602. For example, in some embodiments, check assessment model 606 may compare a check number (part of text content 712) to a check number as indicated in MICR 703. Similarly, in some embodiments, check assessment model 606 may compare a bank district and routing symbol (part of text content 712) to MICR 703. If either or both of the check number or bank district and routing symbol do not match MICR 703, check assessment model 606 may flag check 602 as a potential counterfeit check. Additionally, in some embodiments, check assessment model 606 may flag check 602 as a potential counterfeit check based on the typeface of the amount not matching the typeface of other fields on the check.

While FIG. 7 shows metadata 604 including date 702, MICR 703, amount 704, and check characteristics 706, in some embodiments, metadata may include date 702, MICR 703, and amount 704, without one or all of check characteristics 706. In such embodiments, the level of correspondence of a check 602 to deposit patterns may be determined based only on the level of correspondence of date 702 to the date parameter and amount 704 to the amount parameter, once the payer has been identified from MICR 703. In such embodiments, the one or more confidence scores may be computed based on one or more of the following non-limiting factors:

1. Whether date 702 falls within the date parameter associated with the payer/the difference between date 702 and the center of the date parameter associated with the payer; and
2. Whether amount 704 falls within the amount parameter associated with the payer/the difference between amount 704 and the center of the amount parameter associated with the payer.

In some embodiments, check assessment model 606 may implemented on one or more processors of client device 302, cloud banking system 316, or a third party platform. In some embodiments, check assessment model 606 may be implemented on an edge server within cloud banking system 316.

In some embodiments, check assessment model 606 be a rule based algorithm. In some embodiments, check assessment model 606 may be a ML model. For example, in such embodiments, check assessment model 606 may be an ML model trained on metadata 604 and/or images of checks 602. In such embodiments, check assessment model 606 may be trained using supervised learning, in which images of checks 602 that have been deposited by one or more customers may be provided to an untrained or partially trained version of check assessment model 606 and may be labeled as common checks (e.g., paychecks). In some embodiments, the images of checks 602 may be provided to the untrained or partially trained check assessment model 606 with one or more items of metadata 604, and optionally amount and/or date parameters as discussed herein for one or more customers. As a result, a ML check assessment model 606 may provide a confidence score indicating a likelihood a check 602 is a common check (e.g., a paycheck) in response to an image of check 602 and/or metadata 604 being provided to the ML check assessment model 606. In such embodiments, the ML check assessment model 606 may be trained on ML platform 329 and run on either ML platform 329 or client device 302.

Figure 8:
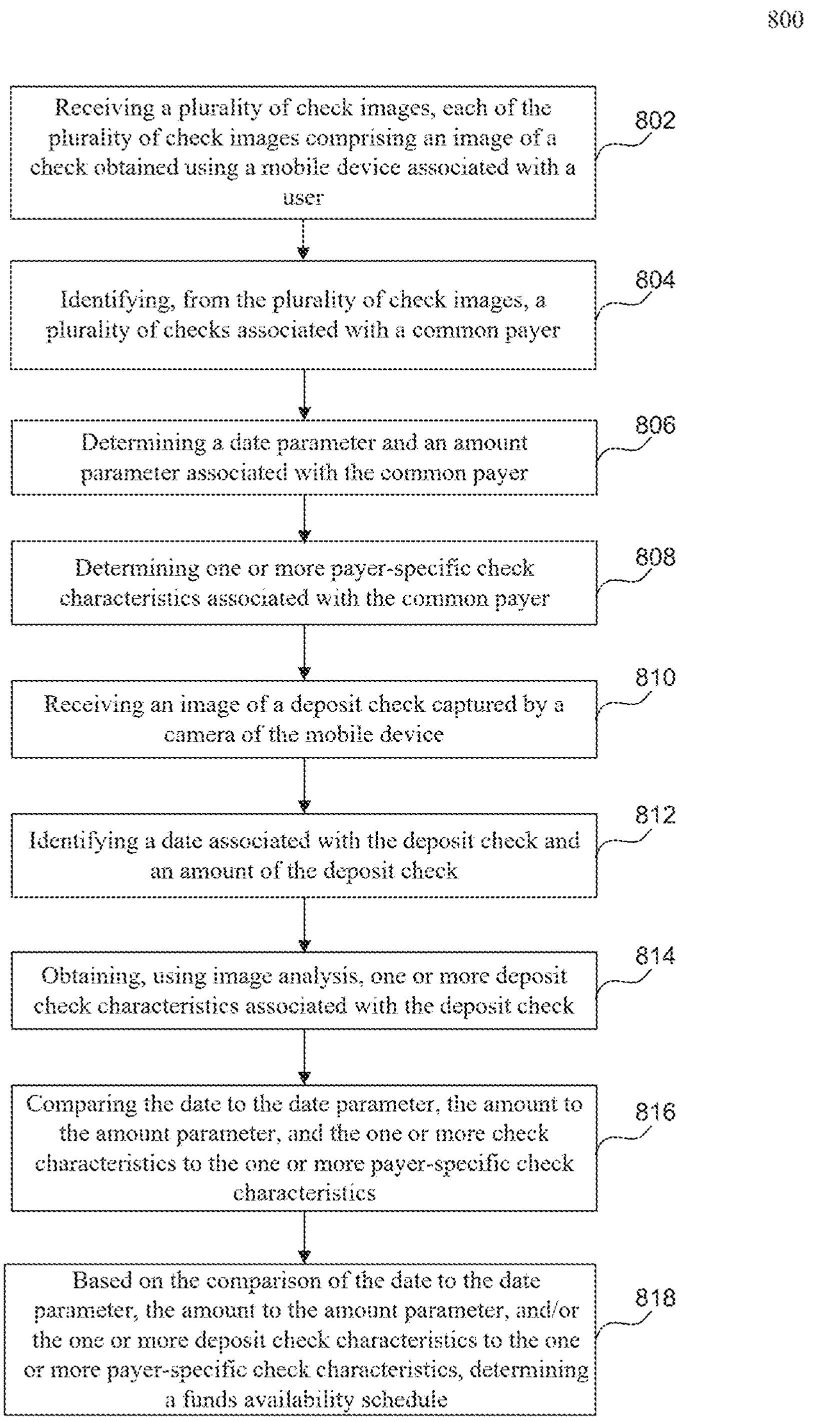
FIG. 8 illustrates a flow diagram of an example method, according to some embodiments and aspects.

FIG. 8 is a flow chart depicting a check assessment method 800 that may be carried out in line with the discussion above. One or more of the operations in the method depicted by FIG. 8 could be carried out by one or more entities, including, without limitation, validation module 326, ML platform 329, client device 302, or other server or cloud-based server processing systems and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations. In some embodiments, the systems described generate may assess an image of a financial instrument to determine whether the financial instrument corresponds to past deposit patterns and/or whether the financial instrument is potentially counterfeit.

Unless stated otherwise, the steps of method 800 need not be performed in the order set forth herein. Additionally, unless specified otherwise, the steps of method 800 need not be performed sequentially. The steps may be performed in a different order or simultaneously. As one example, step 806 of method 800 need not be performed before step 808. Rather, step 808 may be performed simultaneously with or before step 806. Further, method 800 may not include all the steps illustrated. For example, in some embodiments, method 800 may not include steps 808 and 814, and the parts of steps 816 and 818 relating to "check characteristics."

Step 802 may include receiving a plurality of check images. In some embodiments, each of the plurality of check images may include an image of a check (e.g., a check 602) obtained using a mobile device associated with a user (e.g., mobile computing device 102/client device 302).

Step 804 may include identifying, from the plurality of check images, a plurality of checks associated with a common payer. In some embodiments, the common payer may be identified using the MICR lines (e.g., MICR 703) and/or text content (e.g., text content 712) of the checks depicted in the plurality of check images, as described above.

Step 806 may include determining a date parameter and an amount parameter associated with the common payer. In some embodiments, the date parameter and/or the amount parameter may further be associated with the user. For example, in some embodiments, the date parameter may be associated with the common payer alone while the amount parameter may be associated with the common payer (as it pertains to transactions involving the common payer and the user, for example, in DB 718) and associated with the user. In some embodiments, determining the date parameter in step 806 may include determining a range of dates conforming to a check issuance pattern.

Step 808 may include determining one or more payer-specific check characteristics associated with the common payer. In some embodiments, the one or more payer-specific check characteristics may include at least one of dimensions, color data, text content, a boundary profile, feature location, or typeface. In some embodiments, determining the one or more payer-specific check characteristics in step 808 may include analyzing images of checks associated with the common payer received from multiple users. In some embodiments, determining the one or more payer-specific check characteristics in step 808 may include determining a percentage of the plurality of checks associated with the common payer that include a check characteristic. In some embodiments, determining the one or more payer-specific check characteristics in step 808 may include determining that a threshold percentage of the plurality of checks associated with the common payer include the one or more payer-specific check characteristics. In some embodiments, step 808 may further include identifying an association of a payroll processing entity and the common payer (for example, as stored in DB 718). In such embodiments, determining the one or more payer-specific check characteristics in step 808 may include identifying one or more check characteristics associated with the payroll processing entity (for example, as stored in DB 718 and linked with the payroll processing entity).

Step 810 may include receiving an image of a deposit check (e.g., another check 602) captured by a camera (e.g., camera 104/camera 308/camera 502) of the mobile device.

Step 812 may include identifying a date (e.g., date 702) associated with the deposit check and an amount (e.g., amount 704) of the deposit check.

Step 814 may include obtaining, using image analysis, one or more deposit check characteristics (e.g., check characteristics 706) associated with the deposit check. In some embodiments, the one or more deposit check characteristics may include at least one of dimensions (e.g., dimensions 708), color data (e.g., color data 710), text content (e.g., text content 712), a boundary profile (e.g., boundary profile 714), feature location (e.g., feature location 716), or typeface (e.g., typeface 717). In some embodiments, the image analysis of step 814 may include extracting a color code including at least one of an RGB code, a HEX code, or an HSL code. In some embodiments, the image analysis may include OCR. In some embodiments, image analysis used to identify the date associate with the deposit check and the amount associate with the deposit check in step 812 and/or the image analysis used to obtain the one or more deposit check characteristics in step 814 may include active image analysis performed at the mobile device (e.g., active OCR or AR enabled image processing). In such embodiments, an instant funds availability determination may be provided to the user in real time.

Step 816 may include comparing the date to the date parameter, the amount to the amount parameter, and the one or more check characteristics to the one or more payer-specific check characteristics.

Step 818 may include determining a funds availability schedule based on the comparison of the date to the date parameter, the amount to the amount parameter, and the one or more deposit check characteristics to the one or more payer-specific check characteristics. In some embodiments, determining the funds availability schedule may include determining that the amount of the deposit check is available to the user in real time (e.g., as a response to the user capturing an image and/or submitting a deposit request in mobile banking app 304, before the user closes mobile banking app 304).

In some embodiments, method 800 may include (for example, between steps 816 and 818), calculating a confidence score indicating a likelihood the deposit check is a paycheck. In some embodiments, in calculating the confidence score, the comparison of the date to the date parameter, the amount to the amount parameter, and the one or more deposit check characteristics to the one or more payer-specific check characteristics may each be weighted differently from one another. For example, weights W1, W3, and a group of weights W4-W9 may each be weighted differently from another, as described with respect to FIG. 7.

In some embodiments, method 800 may include (for example, between steps 804 and 806 or between steps 814 and steps 816), storing in a database (e.g., DB 718) images of the plurality of checks associated with the common payer, each of the images of the plurality of checks associated with the common payer being linked to a metadata file (e.g., including metadata 604) including a date (e.g., date 702), an amount (e.g., amount 704), and one or more check characteristics (e.g., check characteristics 706) determined using image analysis. In some embodiments, method 800 may include determining the date parameter in step 806 based on the date, determining the amount parameter in step 806 based on the amount, and determining the one or more payer-specific check characteristics in step 808 based on the one or more check characteristics. In some embodiments, determining the date parameter in step 806 may include determining a range of dates conforming to a check issuance pattern. In some embodiments, the check issuance pattern may be determined using the date stored in the metadata file. In some embodiments, the check issuance pattern may further be determined based on dates associated with images of checks associated with the common payer and received from multiple users (e.g., via mobile banking apps 304 in use by multiple customers).

The solutions described above improve upon current remote deposit processes. The various embodiments solve at least the technical problem of calculating a funds availability schedule, in some cases, without substantial processing by a computationally intensive model (e.g., a backend ML, model) that considers manifold features of a customer's past deposit history. Instead, the various embodiments described herein may provide means of quickly and easily identifying whether a deposit check corresponds to common deposit activity, such that additional processing may be avoided and funds may be immediately released to the customer (and/or a deposit limit may be modified). This may reduce processing complexity and more efficiently utilize the limited system resources of remote deposit system 300.

Further, the various embodiments described herein may provide means of identifying counterfeit checks based on lack of correspondence to similar past checks. The various embodiments described herein may overcome the technical problems banks (or other institutions) face in detecting fraudulent transactions when a physical check is not available for inspection by the bank. For example, the various embodiments described herein may overcome the difficulties banks face in remotely identifying certain features, for example, unusual thickness, pliability, presence or lack of edge features (e.g., serrations from a tear line), lack of magnetic ink within a MICR line, etc., that would indicate a check is counterfeit. Additionally, it may be difficult for computer systems to identify a counterfeit check when the check image is a digitally created image, since the image may have been created from an image of a real check (e.g., a past deposit) with certain features altered. However, the various embodiments described herein provide a means for analyzing digital images to identify fraudulent alterations of an image via comparison of features of a depicted check to past deposit patterns and check characteristics.

While the above disclosure uses a check (e.g., check 602) as an example financial instrument, various embodiments discussed herein may apply to any type of financial instrument (e.g., money orders). Accordingly, the scope of this disclosure should not be limited to the remote deposit of a check alone. Additionally, the embodiments disclosed herein may be implemented with any type of document (e.g., an identification document such as a passport, license, social security card, birth certificate, student card, etc.). In such cases, in some embodiments, document characteristics determined using feature detection program(s) may be compared to those of past documents, but no amount and/or date parameter need be calculated or used in a comparison.

Finally, while an image "capture" or image "upload" has been described occasionally, in some embodiments, the methods discussed herein may be conducted without ever storing an image in permanent memory (e.g., image capture may simply refer to gathering pixel data) and/or without uploading an image to a backend system. For example, in some embodiments, the methods described herein may be performed using an OCR program and/or ML OCR model and feature detection program(s) that operate exclusively at a client device, such that the assessment of metadata (e.g., metadata 604) associated with a check may be conducted without an image every being stored in permanent memory and/or uploaded to a backend system.

Example Computer System

Figure 9:
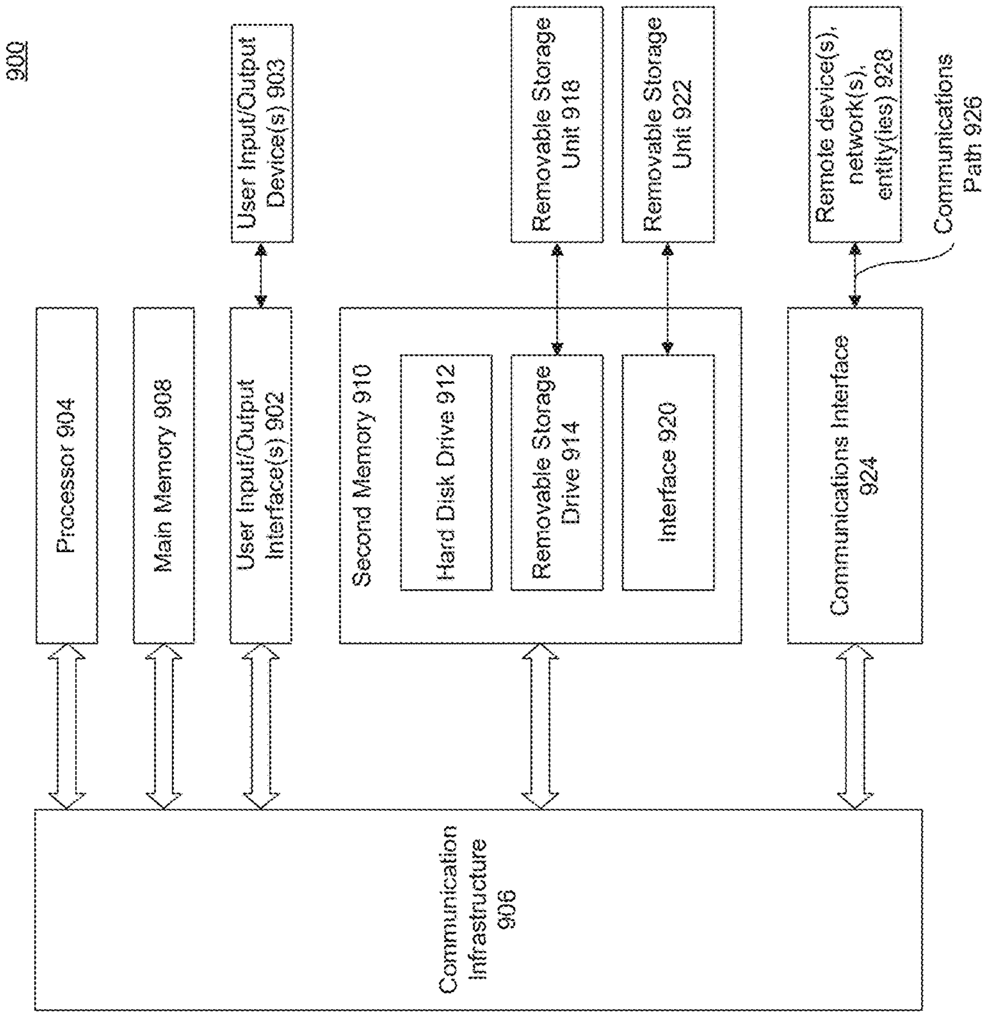
FIG. 9 illustrates an example computer system useful for implementing various embodiments and aspects.

FIG. 9 depicts an example computer system useful for implementing various embodiments. For example, the example computer system may be implemented as part of mobile computing device 102 or cloud banking system 316. Cloud implementations may include a plurality of the example computer systems locally or distributed across one or more server sites.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor(s) 904. In some embodiments, for example, when machine learning models are implemented on client device 302, processor(s) 904 may include a neural processing unit (NPU) and/or a tensor processing unit (TPU). One or more of processor(s) 904 may be connected to a communication infrastructure or bus 906.

Computer system 900 may also include customer input/output device(s) 903, such as monitors, keyboards, pointing devices, etc., which may communicate with communication infrastructure 906 through customer input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML Customer Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A computer-implemented method for a remote deposit environment, comprising:

receiving a plurality of check images, each of the plurality of check images comprising an image of a check obtained using a mobile device associated with a user;

identifying, from the plurality of check images, a plurality of checks associated with a common payer;

determining a date parameter and an amount parameter associated with the common payer;

determining one or more payer-specific check characteristics associated with the common payer;

receiving an image of a deposit check captured by a camera of the mobile device;

identifying a date associated with the deposit check and an amount of the deposit check;

obtaining, using image analysis, one or more deposit check characteristics associated with the deposit check;

comparing the date to the date parameter, the amount to the amount parameter, and the one or more deposit check characteristics to the one or more payer-specific check characteristics; and based on the comparisons of the date to the date parameter, the amount to the amount parameter, and the one or more deposit check characteristics to the one or more payer-specific check characteristics, determining a funds availability schedule.

2. The method of claim 1, wherein determining the funds availability schedule comprises determining that the amount of the deposit check is available to the user in real time.

3. The method of claim 1, further comprising calculating a confidence score indicating a likelihood the deposit check is a paycheck, wherein in calculating the confidence score, the comparisons of the date to the date parameter, the amount to the amount parameter, and the one or more deposit check characteristics to the one or more payer-specific check characteristics are each weighted differently from one another.

4. The method of claim 1, wherein the one or more payer-specific check characteristics comprises at least one of first check dimensions, first color data, first text content, a first boundary profile, a first feature location, or a first typeface, and wherein the one or more deposit check characteristics comprises at least one of second check dimensions, second color data, second text content, a second boundary profile, a second feature location, or a second typeface.

5. The method of claim 1, further comprising receiving additional images of checks associated with the common payer from multiple mobile devices, wherein the determining the one or more payer-specific check characteristics comprises analyzing the additional images of checks associated with the common payer received from the multiple mobile devices.

6. The method of claim 1, further comprising storing in a database images of the plurality of checks associated with the common payer, each of the images of the plurality of checks associated with the common payer being linked to a metadata file, the metadata file comprising:

a date associated with a check of the plurality of checks associated with the common payer;

an amount associated with the check of the plurality of checks associated with the common payer; and one or more payer-specific check characteristics determined, using image analysis, based on an image of the check of the plurality of checks associated with the common payer.

7. The method of claim 6, further comprising:

determining the date parameter based on the date stored in the metadata file;

determining the amount parameter based on the amount stored in the metadata file; and determining the one or more payer-specific check characteristics based on the one or more payer-specific check characteristics stored in the metadata file.

8. The method of claim 6, wherein determining the date parameter comprises determining a range of dates conforming to a check issuance pattern.

9. The method of claim 1, further comprising determining a percentage of the plurality of checks associated with the common payer that include a check characteristic.

10. The method of claim 1, wherein determining the one or more payer-specific check characteristics comprises determining that a threshold percentage of the plurality of checks associated with the common payer include the one or more payer-specific check characteristics.

11. The method of claim 1, wherein the image analysis comprises extracting a color code comprising at least one of a red-green-blue (RGB) code, a hexadecimal (HEX) code, or a hue-saturation-lightness (HSL) code.

12. The method of claim 11, wherein the image analysis further comprises optical character recognition (OCR).

13. The method of claim 1, wherein the image analysis comprises active image analysis performed at the mobile device, and wherein an instant funds availability determination is provided to the user in real time.

14. The method of claim 1, wherein the date parameter and the amount parameter is further associated with the user.

15. The method of claim 1, further comprising identifying an association of a payroll processing entity and the common payer, wherein the determining the one or more payer-specific check characteristics comprises identifying one or more check characteristics associated with the payroll processing entity.

16. The method of claim 8, further comprising receiving additional images of checks associated with the common payer from multiple mobile devices, wherein the check issuance pattern is further determined based on dates associated with the additional images of checks associated with the common payer and received from the multiple mobile devices.

17. A system, comprising:

a memory; and at least one processor coupled to the memory and configured to:

receive a plurality of check images, each of the plurality of check images comprising an image of a check obtained using a mobile device associated with a user;

identify, from the plurality of check images, a plurality of checks associated with a common payer;

determine a date parameter and an amount parameter associated with the common payer;

determine one or more payer-specific check characteristics associated with the common payer;

receive an image of a deposit check captured by a camera of the mobile device;

identify a date associated with the deposit check and an amount of the deposit check;

obtain, using image analysis, one or more deposit check characteristics associated with the deposit check;

compare the date to the date parameter, the amount to the amount parameter, and the one or more deposit check characteristics to the one or more payer-specific check characteristics; and based on the comparisons of the date to the date parameter, the amount to the amount parameter, and the one or more deposit check characteristics to the one or more payer-specific check characteristics, determine a funds availability schedule.

18. The system of claim 17, wherein the one or more payer-specific check characteristics comprises at least one of first check dimensions, first color data, first text content, a first boundary profile, a first feature location, or a first typeface, and wherein the one or more deposit check characteristics comprises at least one of second check dimensions, second color data, second text content, a second boundary profile, a second feature location, or a second typeface.

19. The system of claim 17, wherein determining the date parameter comprises determining a range of dates conforming to a check issuance pattern.

20. A non-transitory computer-readable device having instructions stored thereon that, when executed by at least one computing device, causes the at least one computing device to perform operations comprising:

receiving a plurality of check images, each of the plurality of check images comprising an image of a check obtained using a mobile device associated with a user;

identifying, from the plurality of check images, a plurality of checks associated with a common payer;

determining a date parameter and an amount parameter associated with the common payer;

determining one or more payer-specific check characteristics associated with the common payer;

receiving an image of a deposit check captured by a camera of the mobile device;

identifying a date associated with the deposit check and an amount of the deposit check;

obtaining, using image analysis, one or more deposit check characteristics associated with the deposit check;

comparing the date to the date parameter, the amount to the amount parameter, and the one or more deposit check characteristics to the one or more payer-specific check characteristics; and based on the comparisons of the date to the date parameter, the amount to the amount parameter, and the one or more deposit check characteristics to the one or more payer-specific check characteristics, determining a funds availability schedule.

* * * * *